US011377079B2

United States Patent
Van Thiel

(10) Patent No.: US 11,377,079 B2
(45) Date of Patent: Jul. 5, 2022

(54) ELECTRONICALLY CONTROLLABLE BRAKING SYSTEM AND METHOD FOR CONTROLLING THE ELECTRONICALLY CONTROLLABLE BRAKING SYSTEM

(71) Applicant: WABCO GmbH, Hannover (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 350 days.

(21) Appl. No.: 16/493,775

(22) PCT Filed: Mar. 19, 2018

(86) PCT No.: PCT/EP2018/056841
§ 371 (c)(1),
(2) Date: Sep. 13, 2019

(87) PCT Pub. No.: WO2018/172256
PCT Pub. Date: Sep. 27, 2018

(65) Prior Publication Data
US 2020/0023820 A1    Jan. 23, 2020

(30) Foreign Application Priority Data

Mar. 21, 2017   (DE) ..................... 10 2017 002 716.1

(51) Int. Cl.
*B60T 8/17*    (2006.01)
*B60T 7/04*    (2006.01)
(Continued)

(52) U.S. Cl.
CPC ............... *B60T 8/17* (2013.01); *B60T 7/042* (2013.01); *B60T 7/12* (2013.01); *B60T 13/662* (2013.01);
(Continued)

(58) Field of Classification Search
CPC ...... B60T 13/662; B60T 8/327; B60T 13/683; B60T 7/042; B60T 13/74; B60T 7/12;
(Continued)

(56) References Cited

U.S. PATENT DOCUMENTS 5,466,053 A * 11/1995 Koelzer .................. B60T 15/22
  303/7
5,718,486 A *  2/1998 Vollmer .................... B60T 8/00
  303/15
(Continued)

FOREIGN PATENT DOCUMENTS

DE    602004002927 T2    6/2007
DE    102008009043 B3    5/2009
(Continued)

OTHER PUBLICATIONS

English translation of DE102008009043B3 (Year: 2009).*

*Primary Examiner* — Robert A. Siconolfi
*Assistant Examiner* — Mahbubur Rashid
(74) *Attorney, Agent, or Firm* — Leydig, Voit & Mayer, Ltd.

(57) ABSTRACT

An electronically controllable brake system for a vehicle includes at least one service brake circuit with service brakes and a service brake control module. A service-brake brake pressure can be fed to the service brakes, and the service-brake control module is configured to generate a service-brake control signal as a function of a braking specification. The service-brake brake pressure can be generated as a function of the service-brake control signal and specified to the service brakes, for the implementation of the braking specification via the at least one service brake circuit, under electrical control. The brake system further includes a trailer control valve with a trailer control module. The trailer control module is configured to receive and process an electronically communicated braking specification and the (Continued)

trailer control valve is configured to generate and output, under the control of the trailer control module, a redundancy control pressure.

24 Claims, 7 Drawing Sheets

(51) Int. Cl.
*B60T 7/12* (2006.01)
*B60T 13/66* (2006.01)
*B60T 13/68* (2006.01)
*B60T 13/74* (2006.01)
*B60T 15/02* (2006.01)

(52) U.S. Cl.
CPC ............ *B60T 13/683* (2013.01); *B60T 13/74* (2013.01); *B60T 15/027* (2013.01); *B60T 2240/00* (2013.01); *B60T 2270/403* (2013.01); *B60T 2270/413* (2013.01)

(58) Field of Classification Search
CPC ...... B60T 8/17; B60T 15/027; B60T 2240/00; B60T 2270/403; B60T 2270/413
See application file for complete search history.

(56) References Cited

U.S. PATENT DOCUMENTS

| | | | |
|---|---|---|---|
| 6,206,481 B1* | 3/2001 | Kaisers | B60T 8/327 303/118.1 |
| 2004/0012249 A1* | 1/2004 | Koelzer | B60T 13/66 303/3 |
| 2005/0116533 A1* | 6/2005 | Herges | B60T 13/263 303/3 |
| 2005/0168064 A1 | 8/2005 | McCann | |
| 2007/0170774 A1 | 7/2007 | Gerum et al. | |
| 2009/0184568 A1* | 7/2009 | Bensch | B60T 8/327 303/115.2 |
| 2009/0189438 A1* | 7/2009 | Beier | B60T 13/741 303/3 |
| 2010/0025141 A1* | 2/2010 | Bensch | B60T 8/327 180/271 |
| 2010/0252378 A1* | 10/2010 | Hilberer | B60T 13/683 188/106 F |
| 2011/0005874 A1* | 1/2011 | Beier | B60T 13/683 188/106 F |
| 2011/0144855 A1 | 6/2011 | Herges et al. | |
| 2012/0019054 A1* | 1/2012 | Potter | B60T 13/683 303/14 |
| 2012/0109470 A1* | 5/2012 | Amtsfeld | B60T 13/683 701/48 |
| 2013/0214588 A1* | 8/2013 | Kiel | B60T 15/00 303/6.01 |
| 2014/0197680 A1* | 7/2014 | Gilles | B60T 8/42 303/2 |
| 2015/0239441 A1* | 8/2015 | Klostermann | B60T 15/028 303/7 |
| 2017/0072930 A1 | 3/2017 | Leinung et al. | |
| 2017/0210365 A1* | 7/2017 | Lulfing | B60T 8/327 |
| 2018/0001879 A1* | 1/2018 | Witte | B60T 13/683 |
| 2019/0337503 A1 | 11/2019 | Otremba | |

FOREIGN PATENT DOCUMENTS

| | | | | |
|---|---|---|---|---|
| DE | 102014107278 A1 | 11/2015 | | |
| DE | 102014112015 A1 | 2/2016 | | |
| DE | 102015008377 A1 | 12/2016 | | |
| DE | 102015011296 A1 | 3/2017 | | |
| EP | 0387004 A2 | 9/1990 | | |
| EP | 1099873 A2 | 5/2001 | | |
| EP | 1122142 A1 | 8/2001 | | |
| EP | 2371641 A2 | 10/2011 | | |
| EP | 2090481 B1 | 11/2013 | | |
| EP | 2794368 B1 * | 11/2015 | ............ | B60T 7/042 |
| WO | WO 2004098967 A2 | 11/2004 | | |
| WO | WO 2009152982 A2 | 12/2009 | | |
| WO | WO-2012140002 A3 * | 4/2013 | ........... | B60T 13/385 |
| WO | WO-2015181032 A3 * | 2/2016 | ........... | B60T 13/683 |
| WO | WO 2017001546 A1 | 1/2017 | | |

* cited by examiner

ELECTRONICALLY CONTROLLABLE BRAKING SYSTEM AND METHOD FOR CONTROLLING THE ELECTRONICALLY CONTROLLABLE BRAKING SYSTEM

CROSS REFERENCE TO RELATED APPLICATIONS

This application is a U.S. National Phase Application under 35 U.S.C. § 371 of International Application No. PCT/EP2018/056841, filed on Mar. 19, 2018, and claims benefit to German Patent Application No. DE 10 2017 002 716.1, filed on Mar. 21, 2017. The International Application was published in German on Sep. 27, 2018, as WO 2018/172256 under PCT Article 21(2).

FIELD

The invention relates to an electronically controllable brake system and to a method for controlling said electronically controllable brake system.

BACKGROUND

The brake system in a vehicle, preferably a utility vehicle, can be provided with two or more service brake circuits in which a service-brake brake pressure which is applied to service brakes is set, and a parking brake circuit, in which a parking-brake brake pressure which is applied to spring-loaded brakes is set. The application of the service-brake brake pressure to the service brake for example takes place via a pressure modulator which outputs a service-brake brake pressure to the respective service brakes according to a service-brake braking specification in the form of a pneumatic service-brake control pressure or an electrical service-brake control signal.

In a normal operation, the specification to the pressure modulator is issued electrically via the service-brake control signal, wherein the service-brake control signal is determined and output by a service-brake control module as a function of a manually specified service-brake braking specification and/or as a function of an assistance braking specification which is requested in an automated fashion by an assistance system. In the case of redundancy, e.g. when there is an electrical failure of the service-brake control module, the specification to the actuator takes place via the service-brake control pressure which is specified to the pressure modulator via a pneumatic redundancy port and which is output, for example, by a service-brake activation device which is embodied as an electropneumatic service-brake valve, with a brake pedal, as a function of the service-brake braking specification.

The parking brake circuit serves mainly to park the vehicle in a parking situation or to carry out auxiliary braking or emergency braking during travel in that a parking-brake brake pressure is applied under control by a parking-brake control module, as a function of which parking-brake brake pressure the application of spring-loaded brakes is carried out, wherein the parking-brake brake pressure is reduced for the application of the brakes. For example, such a parking-brake control module or a handbrake module is described in DE 10 2015 008 377 A1. The parking brake circuit and the service brake circuits conventionally operate separately from one another.

In the event of a failure of the electrical actuation of the service-brake circuits via the service-brake control module, it is possible, as described, for a pneumatic fallback level, which is controlled by the driver, to be formed. However, if the driver is not available as a fallback level, since he is e.g. inattentive or in the event of relatively highly automated driving maneuvers not being in place, a further fallback level can be formed in conventional vehicles which can intervene under automated and electronic control, wherein the existing parking brake circuit is used for this purpose. The automated braking request is fed to the parking-brake control module after detection of the electrical failure in one of the service brake circuits, which parking-brake control module can correspondingly activate the spring-loaded brakes by specifying the parking-brake brake pressure, in order to compensate for the electrical failure of the service brakes. Alternatively, the automated braking request can be fed continuously to the parking-brake control module, and when a failure is detected in at least one of the service brake circuits by the parking-brake control module the latter can correspondingly activate the spring-loaded brakes by specifying the parking-brake brake pressure. However, in this case, under certain circumstances braking is carried out at only one vehicle axle on which the spring-loaded brakes are arranged in the parking brake circuit. This can lead to limited deceleration performance and, under certain circumstances, to additional instabilities during travel.

In order to avoid this, EP 2 090 481 B1 describes an electronically controllable brake system in which a rear-axle service brake circuit is controlled by a rear-axle service brake control module, and a front-axle service brake circuit is controlled by a front-axle service brake control module. The parking brake control module for the parking brake circuit is integrated into the front-axle service brake control module, wherein the parking brake circuit controls spring-loaded brakes on the rear axle. The rear-axle service brake control module, the components of the rear-axle service brake circuit and a trailer control valve of the brake system are supplied with energy by a first energy source, and the front-axle service brake control module and the parking-brake control module with the correspondingly assigned components are supplied with energy by a second energy source.

In the event of a failure of the first energy source, i.e. the rear-axle service brake circuit with the service brakes on the rear axle, the front axle can be braked further via the front-axle service brake circuit and the rear axle can be braked via the parking brake circuit, so that both vehicle axles can be continued to be braked. The parking brake circuit therefore compensates the failure of the rear-axle service brake circuit in that instead of being braked with the service brakes it is braked with the spring-loaded brakes on the rear axle. In order in this case to be able to bring about a braking operation in the trailer, the trailer control valve can merely be actuated pneumatically with the service-brake brake pressure of the front axle, since there is no energy available for electrical actuation of solenoid control valves in the trailer control valve.

In the event of a failure of a second energy source, i.e. both of the parking brake circuit on the rear axle and of the front-axle service brake circuit, a service-brake control signal is output by the rear-axle service brake control module, which service-brake control signal is, as in normal operation, transmitted to the rear-axle pressure modulator but additionally also to the trailer control valve of the vehicle. The trailer control valve generates a corresponding control pressure via a pilot control module consisting of magnet control valves which, when it is present, is transmitted to the trailer in order to bring about braking there and at the same time also via a redundancy pressure line to the pneumatic redundancy port on the front-axle pressure modulator. The rear axle and the front axle are therefore braked, as in normal operation, via the service brakes, and the front axle is also controlled by the rear-axle service brake control module.

The parking-brake control module can continue to output a parking-brake control pressure to the trailer control valve which inverts this and passes it onto the service brakes of the trailer, in order to be able to implement a parking brake function also in the trailer.

Therefore, in the prior art it is proposed to actuate each service brake circuit via separate control modules and to compensate a failure of an energy source and therefore of at least one service brake circuit by virtue of the fact that the respectively still functioning brake circuit or circuits performs/perform braking on the vehicle axle where there has been a failure, so that even in the case of redundancy both vehicle axles can still be used for braking. A redundant braking operation of the trailer takes place in this case via manual specification in the respectively still functioning brake circuit.

It is disadvantageous here that no such compensation can take place in electronically controlled brake systems which actuate the service brakes on the rear axle and on the front axle and, if appropriate, on further vehicle axles via the pressure modulator via only one central service-brake control module, since in the event of a failure of the energy source or of individual electrical components of the respective service brake circuit the central service-brake control module can no longer perform the electrical actuation of the service brakes or of the pressure modulators, connected upstream, on individual vehicle axles. Therefore, if they are present in the corresponding brake system, it is only possible to switch over to the pneumatic first fallback level which is controlled by the driver, if the driver also actually intervenes manually. However, a purely electronic braking specification as described in EP 2 090 481 B1 or a possible assistance braking specification which is specified in an automated fashion can no longer be implemented, either in the towing vehicle or in the trailer.

It is also disadvantageous that redundant implementation of a braking specification which is present in the purely electrical form is not possible directly via the trailer control valve in the event of a failure of the first energy source, since in the event of such an electrical failure the trailer control valve is not supplied with energy and therefore only pneumatic actuation of the trailer control valve by the front-axle brake circuit is possible. Purely electrical actuation in a direct way via the trailer control valve is therefore not possible in every case when there is an electrical failure.

SUMMARY

In an embodiment, the present invention provides an electronically controllable brake system for a vehicle. The electronically controllable brake system includes at least one service brake circuit with service brakes and a service brake control module, wherein a service-brake brake pressure can be fed to the service brakes, and the service-brake control module is configured to generate a service-brake control signal as a function of a braking specification, wherein the service-brake brake pressure can be generated as a function of the service-brake control signal and specified to the service brakes, for the implementation of the braking specification via the at least one service brake circuit, under electrical control. The electronically controllable brake system further includes a trailer control valve with a trailer control module, wherein the trailer control module is configured to receive and process an electronically communicated braking specification and the trailer control valve is configured to generate and output, under the control of the trailer control module, a redundancy control pressure as a function of the electronically communicated braking specification. If implementation of the braking specification, under electrical control by the service-brake control module, via the at least one service brake circuit is prevented: the service brake-brake pressure can be generated as a function of the redundancy control pressure generated in the trailer control valve, and can be applied to the service brakes of the at least one service brake circuit, for redundant implementation of the braking specification in the vehicle, and/or a trailer control pressure can be generated as a function of the redundancy control pressure generated in the trailer control valve, and can be output to a trailer for the redundant implementation of the braking specification in the trailer.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
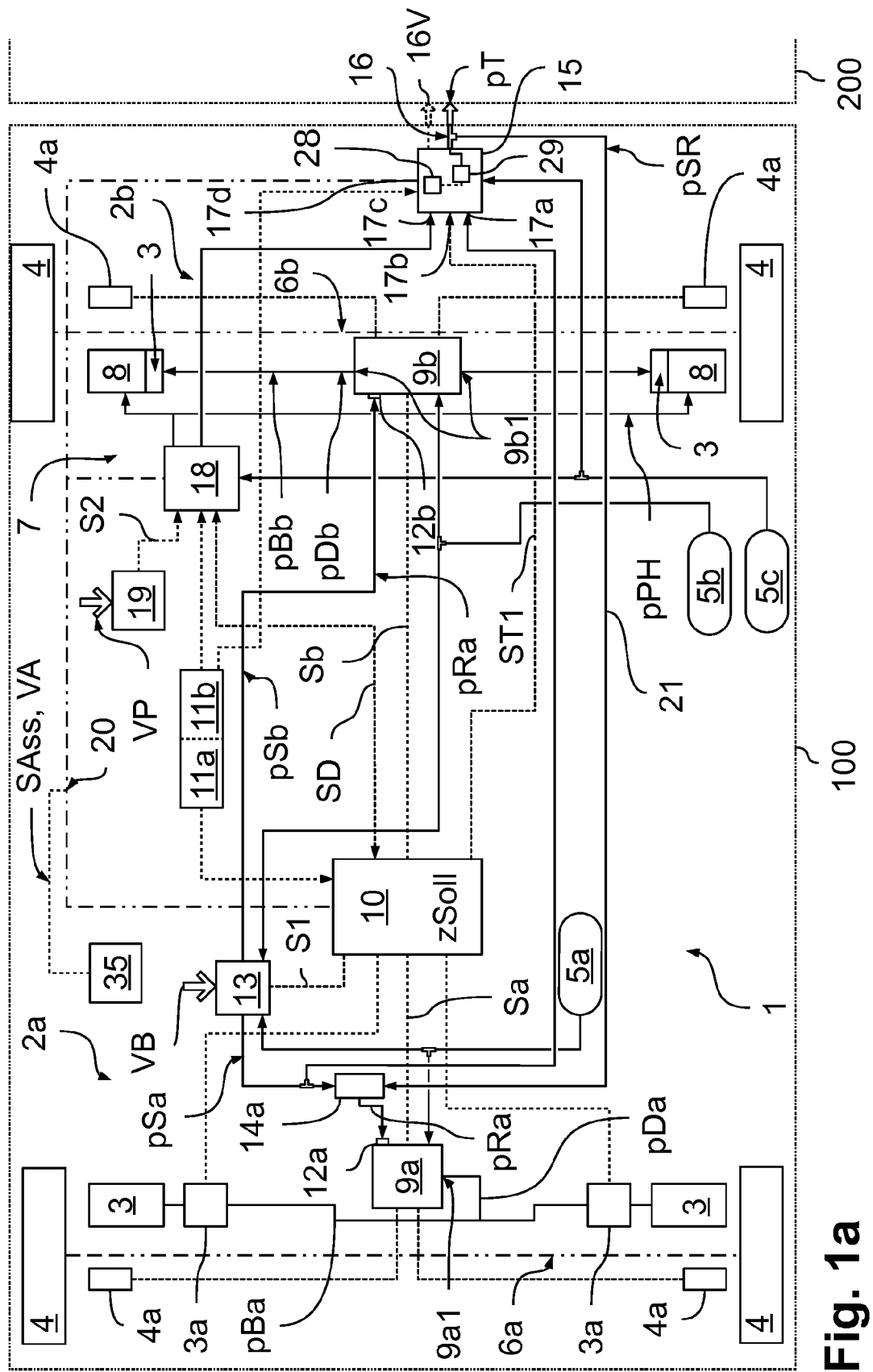
FIGS. 1a, b, and c show electronically controllable brake systems with electrically or pneumatically controllable parking brakes in different embodiments.

Embodiments of the invention provide electronically controllable brake systems and methods for controlling electronically controllable brake systems which permit, in a simple and reliable fashion, electrically redundant actuation of service brakes of a vehicle and/or of a trailer.

According to the invention, there is accordingly provision that, in an electronically controllable brake system in a vehicle, in particular a utility vehicle, with at least one service brake circuit in which a service-brake brake pressure at service brakes is applied, the service-brake brake pressure is defined as a function of a redundancy control pressure which is generated in a trailer control valve, if implementation of a specific requested braking specification via the at least one service brake circuit under electrical control by a service-brake control module is prevented, wherein in the case of electrically controlled implementation of the braking specification in a normal case the service-brake brake pressure can be generated as a function of a service-brake control signal which is generated by the service-brake control module, and said service-brake brake pressure can be output to the service brakes of the respective service brake circuit.

The electrically controlled implementation of the braking specification is not possible, for example, in the event of an electrical failure in at least one of the service brakes. An electrical failure includes here, within the scope of the invention, in particular the case in which generation of the service-brake control signal in the service-brake control module fails, e.g. because the service-brake control module has an electrical defect and therefore it is not possible to specify the service-brake brake pressure as a function of the service-brake functional signal, which in this case is not present. Furthermore, an electrical failure can occur if although a service-brake control signal can be generated and output by the service-brake control module, said service-brake control signal cannot however be converted into a service-brake brake signal, for example owing to an electrical defect in a random electrical component of the respective service brake circuit.

According to the invention, the trailer control valve has a trailer control module which is designed to receive and to process a braking specification which is communicated electronically to the trailer control valve or to the trailer control module, in particular when electrically controlled implementation of the braking specification is not possible via the service-brake control module in the at least one service brake circuit. Then, in the event of the electrical failure in the at least one service brake circuit, the redundancy control pressure is generated, preferably by means of a pre-selection module arranged in the trailer control valve with electronically controllable pressure valves, preferably magnetic control valves, from a pressure medium reservoir under the control of the trailer control module, which redundancy control pressure can then be output for redundant actuation of the at least one service brake circuit.

The intelligence for controlling the trailer control valve and for, in particular redundantly, generating the redundancy control pressure is preferably then arranged in or on the trailer control valve itself or integrated therein, so that processing of braking specifications can take place directly in the trailer control valve, and therefore a compact and retrofittable unit can then be made available.

According to the invention, the redundancy control pressure which is generated in the trailer control valve can also be output as a trailer control pressure to a trailer, in order also to be able to bring about a redundant braking operation in said trailer—under the control of the trailer control module—if e.g. a braking specification cannot be specified to the trailer control module by the service-brake control module in the service brake circuit, in order to generate a trailer control pressure as a function of said braking specification and to output it to the trailer, because e.g. an electrical failure a is present. The trailer control valve in the vehicle can accordingly also be connected in a pressure-conducting fashion to a trailer or to a service-brake braking brake system arranged therein, in order to be able to transmit the trailer control pressure to said trailer.

The trailer control valve according to the invention is therefore advantageously designed to assume the task of a conventional trailer control valve in a vehicle, with which trailer control valve the trailer control pressure can be transmitted to the trailer during normal operation—in accordance with a braking specification of the service-brake control module—via the "yellow coupling head", wherein the logic or intelligence for such actuation is arranged in the form of the trailer control module in the trailer control valve itself. The trailer control valve according to the invention expands a conventional trailer control valve further in order to implement the possibility, in the event of an electrical failure, of still implementing a braking specification, transmitted electrically in another way to the trailer control valve, in the service brake circuit and/or also in the trailer in at least one service brake circuit or in the service-brake control module. The trailer control module which is integrated in the trailer control valve is therefore designed to assume the control of the respective service brakes in the trailer and/or in the vehicle both during normal operation and in the case of redundancy.

Therefore, it is already possible to achieve the advantage that by means of suitable intelligence in the trailer control valve in the form of the trailer control module, which can be easily retrofitted in a conventional trailer control valve, an electrically specified braking specification can be processed and also implemented redundantly in addition to the trailer via the service brake circuits of the vehicle if an electrical failure is actually present in these service brake circuits and the respective braking specification therefore cannot be implemented under the control of the service-brake module.

Therefore, components which are present in any case in the vehicle can advantageously be used in a multiple fashion by means of modular expansion, i.e. for a conventional trailer brake control operation during normal operation and redundant actuation of the service brake both in the vehicle and in the trailer. As a result there can be a saving in cost, and the space required and the expenditure on open-loop and closed-loop control in the brake system can be minimized, since only a few additional components have to be installed and actuated in the vehicle. In this context, it is to be ensured, in particular, that in the case of an electrical failure the redundancy control pressure can be input into the corresponding service brake circuit via an additional redundancy pressure line.

The trailer control valve can therefore preferably continue to be used for actuating the service brakes in the trailer during normal operation, i.e. without an electrical failure in the at least one service brake circuit, for example as a function of a parking-brake braking specification in a parking brake circuit of the brake system or as a function of a service-brake braking specification from the service brake circuit which is then still functioning, or as a function of an assistance braking specification which is specified in an automated fashion, as is the case in conventional brake systems.

Here, there can be provision that the redundancy control pressure is specified to only one service brake circuit of the vehicle, in particular to a front-axle service brake circuit or else to further service brake circuits in the vehicle if an electrical failure has occurred and the failure is to be compensated by braking at further vehicle axles with service brakes. The embodiment variants which are described below are to be correspondingly provided in an identical fashion on just one vehicle axle or, if appropriate, also on further vehicle axles or in further service brake circuits.

In order to be able to bring about application of the respective pressures in the respective brake circuits there is provision that the at least one service brake circuit is supplied with energy by a first energy source, and the trailer control valve and optionally also the parking brake valve are supplied with energy by a second energy source, wherein the first energy source is independent of the second energy source. This is intended to ensure that in the event of a failure of the first energy source which is responsible for the service brake circuit, it will continue to be possible to generate and output a redundancy control pressure in the trailer control valve, in order to be able to specify said redundancy control pressure to the failed service brake circuit or circuits and to the trailer.

The trailer control valve can, furthermore, in an optional configuration, be designed to generate the redundancy control pressure as a function of a braking specification which can be implemented in a parking brake circuit of the brake system, wherein the redundancy control pressure is defined for this purpose in such a way that it is inversely proportional to a parking-brake brake pressure and/or parking-brake control pressure and/or a control pressure which is associated with it, which pressures can be generated as a function of the braking specification in the parking brake circuit and spring-loaded brakes which are arranged in the parking brake can be actuated as a function thereof, in order to implement the braking specification via the parking brake circuit. Here, the pressures can be generated by inversion in the trailer control valve.

As a result, it is already possible to obtain the advantage that a braking specification which is specified to the parking brake circuit can also be applied to the trailer via the trailer control valve within the scope of the parking brake function during normal operation, i.e. without an electrical failure. However, under certain circumstances this can also be used in the redundant driving mode, i.e. when there is an electrical failure in the at least one service brake circuit, in order to divert the braking specification in the parking brake circuit also to the at least one service brake circuit and also to the trailer, in order also to be able to bring about a redundant braking operation in said trailer as a function of the braking specification in the parking brake circuit, and to compensate an electrical failure thereby. As a result, if desired, further redundancy can be formed.

The inversion which is brought about in the trailer control valve preferably then takes place via an inverse relay valve which is arranged in the trailer control valve and is already likewise present, for example, in a conventional trailer control valve. Inversion can be understood within the scope of the invention to mean that the trailer control valve or the inverse relay valve ensure that a redundancy control pressure which is inversely proportional to the parking-brake brake pressure and/or parking-brake control pressure is generated and output. As a result, it can advantageously be ensured that a parking-brake brake pressure which can be generated in the parking brake circuit in order to actuate the spring-loaded brakes and/or parking brake control pressure, which each characterize the braking specification which is specified to the parking brake circuit, can be used immediately after the inversion to actuate the service brakes in the vehicle and/or in the trailer and to convert the braking specification in the at least one service brake circuit and/or in the trailer via said service brakes. That is to say via the service brakes in the service brake circuit and/or in the trailer, approximately the same braking effect is achieved as a function of the inverted parking-brake brake pressure and/or the inverted parking-brake brake pressure as via the spring-loaded brakes in the parking brake circuit as a function of the parking-brake brake pressure and/or the parking-brake control pressure. Therefore, in the event of an electrical failure in the service brake circuits it is possible to dispense with costly pressure control means for generating the service-brake brake pressure.

According to a first alternative, the parking brake circuit in the brake system can have a parking-brake control module which generates the parking-brake brake pressure as a function of the braking specification, wherein in this alternative the braking specification is electrically transmitted to the parking-brake control module. The parking brake control module is connected to the spring-loaded brakes of the parking brake circuit, in order to transmit the parking-brake brake pressure pneumatically to the spring-loaded brakes. That is to say an electrically controlled parking brake is present.

The braking specification to the trailer control valve and/or the parking brake circuit can be, within the scope of the invention, an assistance braking specification which is requested in an automated fashion and which is generated by an assistance control module in an automated fashion. The assistance control module is provided for controlling the vehicle in an automated fashion on the basis of surroundings information, wherein the vehicle can be braked in an automated fashion on the basis of the assistance braking specification, and the assistance braking specification can for this purpose be implemented both by the at least one service brake circuit and/or via the parking brake circuit. Furthermore, the braking specification can be a parking-brake braking specification which is requested manually by the driver via a parking-brake activation device and/or a service-brake braking specification which is requested manually via a service-brake activation device, e.g. an electropneumatic service brake valve or a purely electrically controlled service-brake activation device and which in the ways described can also be specified redundantly via the trailer control valve to the service brakes in the respective service brake circuit for implementation.

In the event of an electrical failure of the at least one service brake circuit or of the parking brake circuit, there can be provision within the scope of redundant braking that the respective braking specifications directly to the trailer control valve or the trailer control module or optionally to the respective still functioning brake circuits are applied in order to compensate for the electrical failure. This can be ensured by corresponding networking of the respective components e.g. via a random vehicle-internal (bus) network or CAN bus or via a direct connection of the individual components. Accordingly, all the specified braking specifications can serve as redundant braking specifications in each of the brake circuits, and in the event of an electrical failure of one of the service brake circuits, they can be input, preferably directly via the trailer control valve but also under some circumstances via the parking brake circuit into the brake system and can then, as described, be redirected to the at least one service brake circuit and/or the trailer via the trailer control valve.

In order to ensure this, in one embodiment, the parking-brake control module of the electrically controlled parking brake is also connected to the trailer control valve in order to transmit the parking-brake brake pressure or a pressure associated therewith, for example a control pressure generated internally in the parking-brake control module, pneumatically or electrically to the trailer control valve and to invert it therein and output it as a redundancy control pressure.

According to an alternative embodiment, the pneumatic parking brake is provided, wherein for this purpose a parking brake valve is arranged in the parking brake circuit, which parking brake valve can be activated manually by the driver in order to request the parking-brake braking specification. The parking brake valve outputs, as a function of the parking-brake braking specification a parking-brake control pressure which is increased in air volume in a relay valve and subsequently output as a parking-brake brake pressure to the spring-loaded brakes, in order to implement the parking-brake braking specification. The parking-brake control pressure which is output by the parking brake valve or a pressure which is associated therewith is transmitted to the trailer control valve via a pressure line, and is inverted therein via the inverse relay valve, in order to specify the redundancy control pressure.

Therefore, in two alternatives, a parking-brake braking specification can be transmitted via a pneumatic parking brake or a parking-brake braking specification and/or an assistance braking specification and/or also a service-brake braking specification can be transmitted to the trailer control valve via an electric parking brake in the parking brake circuit. In the case of an electrical failure of the at least one service brake circuit, it is therefore also possible to have recourse to the parking brake circuit which is present in the vehicle, in order to receive via the latter a braking specification in the form of a manual parking-brake braking specification and/or service-brake braking specification and/or the assistance braking specification which is requested in an automated fashion, and to divert it via the trailer control valve to the service brakes in the vehicle and/or in the trailer and therefore to actuate the latter redundantly. There is this possibility, alongside the possibility of also conveying these braking specifications directly to the trailer control module in the trailer control valve and thereby generating and outputting the redundancy control pressure. Which redundant implementation takes place can be specified, for example, by the trailer control module.

So that, in the case of an electrical failure of the service brake circuits, the redundancy control pressure which is output via the trailer control valve via the redundancy output can be applied to the service brakes and so that said redundancy control pressure can therefore be fed into the respective service brake circuit, a redundancy pressure line which starts from the redundancy output leads to the respective service brake circuits. The position of the feed into the respective service brake circuit can be defined as follows:

Firstly, in the at least one service brake circuit in each case a pressure modulator is provided which is designed to output a pressure-modulator output pressure via a pressure modulator output as a function of the service-brake control signal, wherein the pressure-modulator output pressure can be transmitted as a service-brake brake pressure to the service brakes in order to implement a requested braking specification. This is the case during normal operation, i.e. without electrical failure in the service brake circuits, of the brake system.

According to one embodiment, the pressure modulator has a pneumatic redundancy port, wherein either the redundancy control pressure or a service-brake control pressure which is output by the service-brake activation device, embodied as an electropneumatic service brake valve, on the basis of the service-brake braking specification, can be specified to the pneumatic redundancy port as a redundancy pressure. According to this embodiment, the feeding of the redundancy control pressure into the service brake circuit can therefore take place via the pneumatic redundancy port on the respective pressure modulator.

The optional specification of the redundancy pressure preferably takes place via a switching valve which is connected upstream of the redundancy port, wherein, in a first switching-valve switched position, the switching valve connects the service brake valve to the redundancy port in order to specify the service-brake control pressure as a redundancy pressure, and in a second switching-valve switched position the switching valve outputs the redundancy control pressure to the redundancy port of the pressure modulator in order to specify the redundancy control pressure as a redundancy pressure.

The pressure modulator is designed, if specification of the service-brake brake pressure as a function of a service-brake control signal is not possible, i.e. electrical failure has occurred in the respective service brake circuit, to generate the pressure-modulator output pressure as a function of the service-brake control pressure which is optionally fed to the redundancy port or of the redundancy control pressure. As a result, it is easily possible to form two fallback levels in which redundant braking can be specified and implemented manually or in an automated fashion via the trailer control valve and/or the parking brake circuit or manually directly via the service brake valve. For this purpose, in an existing brake system with a pneumatically redundant and electrically actuatable pressure modulator, advantageously only one additional switching valve has to be provided for this purpose, via which switching valve the redundancy control pressure which is generated in the trailer control valve can be output to the redundancy port.

According to an alternative embodiment, in which the pressure modulator can only be actuated electrically and accordingly a redundancy pressure cannot be predefined, the switching valve is arranged upstream of the service brakes in the at least one service brake circuit in the pressure path transmitting the service-brake brake pressure, so that either the pressure-modulator output pressure or the redundancy control pressure can be specified as the service-brake brake pressure. In this case, the service-brake activation device is preferably embodied in a purely electrically controlled fashion, i.e. a service brake valve is not provided.

In the first switching-valve switched position the pressure modulator output is connected to the service brakes in order to specify the pressure-modulator output pressure as a service-brake brake pressure to the service brakes, and in the second switching-valve switched position, the redundancy control pressure is output to the service brakes in order to specify the redundancy control pressure, which is, if appropriate, additionally increased in volume, as a service-brake brake pressure to the service brakes.

According to one embodiment, the switching valve can for this purpose be arranged directly on a vehicle axle which is assigned to the at least one service brake circuit, wherein the trailer control valve then outputs the generated redundancy control pressure via a redundancy pressure line to the switching valve upstream or downstream of the pressure modulator on the respective vehicle axle.

According to one alternative embodiment, the switching valve is integrated as a redundancy switching valve into the trailer control valve. Accordingly, either the service-brake control pressure or the pressure-modulator output pressure is to be fed to the trailer control valve, depending on the design of the brake system, in order to specify said pressures to the integrated redundancy switching valve. The specification of the redundancy pressure to the redundancy port then takes place by virtue of the fact that in the first switching-valve switched position the service brake valve is connected via the redundancy switching valve to an additional redundancy output on the trailer control valve, and in the second switching-valve switched position the redundancy control pressure which is generated in the trailer control valve is output via the redundancy switching valve to the redundancy output, wherein the redundancy output of the trailer control valve is connected to the redundancy port of the pressure modulator or to the service brakes.

Therefore, in two alternative arrangements of the switching valve it is advantageously possible for switching to take place between the driver's request and the redundancy control pressure, wherein in the case of the solution which is integrated into the trailer control valve, improved retrofittability is provided. In that case, the switching function can be retrofitted at the same time as the installation of the trailer control valve in the vehicle. In addition, there can be a saving in space on the vehicle axles, since installment of the switching valves on the vehicle axle can be dispensed with. In addition, just one switching valve can be used for both vehicle axles.

On the other hand, with the switching valves which are arranged on the vehicle axles it is possible to bring about different redundant actuation on each axle, and when there is a trailer control valve already present with an inversion function, the brake system can be upgraded in a modular fashion by retrofitting individual switching valves on the vehicle axles.

If there is provision in the integrated solution for the redundancy control pressure to also be used as a trailer control operating pressure for outputting to a trailer, the redundancy control pressure is to be output separately as a trailer control pressure to the trailer via a trailer output ("yellow coupling head") and to the respective service brake circuit via the redundancy output. In this case, therefore in contrast to the other solution, the specifications to the trailer and the service brake circuit can be made via the same output to the trailer control valve.

The switching can take place in a situationally conditioned fashion, for example when a redundant service-brake braking specification by the driver has been sensed and stronger braking is requested via this service-brake braking specification than via some other redundant braking specification which is not requested by the driver and which is currently being implemented at the respective time. Otherwise, there can also be provision that when a service-brake braking request by the driver is sensed another currently implemented braking specification, which causes, in particular, a stronger braking effect than the manually requested service-brake braking specification, is ended in a controlled fashion and subsequently the switching valve is moved into the first switching-valve switched position in which the service-brake braking specification can be implemented by the driver. Instabilities during the switching can be avoided by means of this procedure.

The switching of the switching valve into the first switching-valve switched position when a driver's request is present can take place here in a pneumatically or electrically controlled manner depending on the type of switching valve, i.e. the switching valve is switched automatically into the first switching-valve switched position by virtue of the fact that a certain service-brake brake pressure is present at the switching valve, or the service-brake brake pressure is measured, preferably with a pressure sensor, and the switching valve is moved into the first switching-valve switched position under electrical control as a function of the measurement.

In both embodiments, the switching valve can be embodied for this purpose as a shuttle valve or select high valve or as an electrically or pneumatically controllable 3/2-way valve, wherein the shuttle valve is designed to output the higher of the two pressures present at the switching-valve inputs to the switching-valve output (select high valve). In order to be able to switch to the driver's request in a situation-dependent fashion in this case, it is necessary to ensure that the redundancy control pressure which is also fed to the shuttle valve is reduced in a controlled fashion, i.e. redundant braking which has already been carried out is ended in a controlled fashion. As a result, when a service-brake braking specification which is pneumatically predefined via the service brake valve is present, the redundancy control pressure is lower than the service-brake control pressure so that the shuttle valve which is embodied as a select high valve is moved automatically into the first switching-valve switched position.

The 3/2-way valve switches into the first switched position or the second switched position as a function of an, for example, electrically specified switching signal. Therefore, with both variants of the switching valve it is advantageously possible to specify automatically or in an actively controlled fashion which braking specification is fed to the service brakes, in particular in the case of an electrical failure of the at least one service brake circuit.

The switching signal can for this purpose preferably be generated as a function of whether a manually requested service-brake braking specification is present, i.e. the driver would like to intervene in the braking. For this purpose, for example a pressure sensor can be provided in the brake system, preferably in the trailer control valve or on the service brake valve, wherein the pressure sensor is designed to measure the service-brake control pressure applied by the service brake valve, and to output a braking request signal as a function of said pressure. The switching signal is then output to the 3/2-way valve as a function of the braking requests in order to set the corresponding switching-valve switched position. According to a further alternative, the 3/2-way valve can also have a pneumatic control input to which e.g. the service-brake control pressure or a pressure which is proportional thereto is fed as a switching control pressure. The switching valve can then be switched into the corresponding switching-valve switched position on the basis of the switching control pressure at the pneumatic control input. The braking request can also alternatively be detected electrically if, for example, a purely electric service-brake activation device is present, and the corresponding switching-valve switched position can be set as a function of this electrical detection.

In both variants of the switching valve, it is therefore possible to ensure, in particular in the case of electrical failure of the at least one service brake circuit and subsequently induced redundant braking, that the driver can intervene redundantly in the braking by correspondingly switching the switching valve if the driver is in place or attentive, and also intervenes in a pneumatically redundant fashion himself via the service-brake valve. When a service-brake braking specification is present, a redundancy control pressure which is also possibly redundantly specified on the basis of the braking specification in the parking brake circuit can be ended in a controlled fashion by the driver before the first switching-valve switched position is set, in order to subsequently implement the driver's request.

In order to prevent redundant braking in certain situations by predefining the redundancy control pressure at at least one of the service brake circuits via the redundancy pressure line, there can be provision to arrange, in the redundancy pressure line, a shutoff valve which is connected downstream of the redundancy output of the trailer control valve, wherein in a first shutoff-valve switched position the shutoff valve connects the redundancy pressure line to a bleeding port for bleeding the redundancy pressure line, and in a second shutoff-valve switched position the shutoff valve connects the redundancy pressure line to the redundancy output of the trailer control valve in order to redundantly specify the service-brake brake pressure as a function of the redundancy control pressure.

The additional shutoff valve is advantageous here for the desired shutoff function in particular when a shuttle valve is provided as the switching valve. However, if the switching valve is embodied as an electrically controllable 3/2-way valve, the shutoff valve can also be dispensed with and the shutoff function of the shutoff valve can instead also be ensured by the switching valve which is present in any case by virtue of the fact that said shutoff valve is moved by electrical actuation into the corresponding switching-valve switched position in which the service-brake brake pressure is not specified by the redundancy control pressure but rather by the service-brake control pressure which also brings about bleeding without activation of the service brake valve.

The shutoff valve can also be integrated in a corresponding form into the trailer control valve and therefore specify whether a pressure is output at the redundancy output of the trailer control valve or whether the redundancy pressure line is to be bled. As a result, the retrofittability and the space requirement can be improved, since only one compact component has to be retrofitted or provided.

Therefore, the specification of the redundancy control pressure to the service brakes can be easily prevented if, for example in the case of permanent shutting off of the vehicle, it is not desired to supply the service brakes continuously with a service-brake brake pressure. In the case of shutting off, the service brakes can be bled for this purpose via the bleeding port in the corresponding shutoff-valve switched position. As a result it is possible to avoid bleeding of service-brake pressure medium reservoirs in the brake system if leakages occur in the service brake circuit.

According to the invention it is accordingly possible in a method firstly to detect whether the service-brake brake pressure in the at least one service brake circuit is possible, as a function of the service-brake control signal which can be output e.g. by the service-brake control module, for implementing the respective braking specification of the service brakes, and accordingly the desired braking specification can be implemented under electrical control. If this is not the case, i.e. if, for example a defect is present in the service-brake control module and the latter correspondingly cannot output any service-brake control signals, the redundancy control pressure is generated electrically in the trailer control valve, as described above, as a function of the braking specification specified to the trailer control module, and the service-brake brake pressure in the at least one service brake circuit and/or also the trailer control pressure for a possibly coupled trailer is output, as described, as a function of the redundancy control pressure.

In this context, there can either be provision for the redundancy control pressure to be applied directly as a service-brake brake pressure to the service brakes or for it firstly to be used to actuate the pressure modulator in a pneumatically redundant fashion, after which the pressure modulator generates the service-brake brake pressure as a function thereof and applies it to the service brakes.

FIG. 1a shows a schematic illustration of a vehicle 100 with a brake system 1, which can be braked in two service brake circuits 2a, 2b via service brakes 3 on the wheels 4. A front-axle service brake circuit 2a is assigned to a front axle 6a, and a rear-axle service brake circuit 2b assigned to a rear axle 6b. Further vehicle axles can also be provided, to which the vehicle axle service brake circuits 6a and 6b or further service brake circuits are assigned. In each case the pressure medium reservoir 5a, 5b is assigned on an axle basis to the service brake circuits 2a, 2b.

A parking brake circuit 7 is also assigned to the rear axle 6b, wherein the wheels 4 on the rear axle 6b can be braked in this parking brake circuit 7 via a spring-loaded brakes 8, so that the wheels 4 of the rear axle 6b can be decelerated both in the rear-axle service brake circuit 2b via the service brakes 3, and in the parking brake circuit 7 via the spring-loaded brakes 8. For this purpose, combined service/spring-loaded brakes are provided on the rear axle 6b. The parking brake circuit 7 is supplied with pressure medium by an independent parking-brake pressure medium reservoir 5c.

In order to activate the service brakes 3 and therefore to implement a requested braking specification which is characterized by a vehicle setpoint deceleration zSoll or a setpoint brake pressure, in each case a pressure modulator 9a, 9b is arranged in each of the two service brake circuits 2a, 2b on the respective vehicle axle 6a, 6b, wherein the two pressure modulators 9a, 9b according to this exemplary embodiment can be actuated electrically or pneumatically in order to apply a specific service-brake brake pressure pBa, pBb to the service brakes 3 of the respective vehicle axle 6a, 6b and therefore bring out application of the service brakes 3. Basically, the service-brake brake pressure pBa, pBb can be specified individually for each of the individual service brakes 3, for example within the scope of a traction control process which is carried out at the individual wheels 4 on the basis of the data from wheel speed sensors 4a. The traction control process can take place directly on the rear axle 6b by means of the rear-axle pressure modulator 9b, and on the front axle 6a via ABS control valves 3a which are connected upstream of the service brakes 3.

In the normal driving mode, the respective pressure modulators 9a, 9b are actuated electrically via service-brake control signals Sa, Sb, wherein the respective service-brake control signals Sa, Sb are generated in a service-brake control module 10, as a function of the respective braking specification or the vehicle setpoint deceleration zSoll, in such a way that the respective pressure modulator 9a, 9b applies to the service brakes 3 a service-brake brake pressure pBa, pBb with which the requested braking specification is implemented. The service-brake control signal Sa, Sb can be output here, for example via a CAN bus or some other network, an analogue or pulse-width-modulated control signal with which a pressure-modulator output pressure pDa, pDb is generated in a known fashion in the pressure modulator 9a, 9b via pressure valves, which pressure-modulator output pressure pDa, pDb is output as a service-brake brake pressure pBa, pBb via a pressure-modulator output 9a1, 9b1 to the respective service brake 3.

The pressure modulators 9a, 9b are therefore each electrically connected to the service-brake control module 10 which can electrically control the braking effect on an individual basis in the two service-brake brake circuits 2a, 2b, and in this context is embodied as a central control module which during normal operation is responsible for the electrical implementation of the braking specification in the two service-brake brake circuits 2a, 2b. The service-brake control module 10 and the respective pressure modulators 9a, 9b as well as further components of the respective service-brake brake circuits 2a, 2b are supplied with energy by a first energy source 11a according to this exemplary embodiment.

The vehicle setpoint deceleration zSoll can be defined manually here by the driver, who predefines a service-brake braking specification VB, for example via a brake pedal, through manual activation of a service brake valve 13, which service-brake braking specification VB is output to the service-brake control module 10 via a service-brake activation signal S1 and from which the vehicle setpoint deceleration zSoll follows. Furthermore, in the automated driving mode an assistance braking specification VA which is specified in an automated fashion can be output by an assistance control module 35 via an assistance control signal SAss, which assistance braking specification VA is also transmitted to the service-brake control module 10, for example via a CAN bus 20 or another networking vehicle 100, and also corresponds to a specific vehicle setpoint deceleration zSoll.

The assistance control module 35 is designed here to control the vehicle 100 in an automated fashion on the basis of information about the surroundings, in particular to brake it according to the assistance braking specification VA, and, as a function thereof, to output the assistance control signal SAss in particular to the brake system 1.

In order to continue to ensure implementation of the service-brake braking specification VB or of the assistance braking specification VA, i.e. of the vehicle setpoint deceleration zSoll in the event of an electrical failure, a plurality of fallback levels can be switched to. In this context, the fallback levels ensure that the electrically controllable brake system 1 is suitable for a certain degree of automation within the scope of an electronically controlled autonomous driving mode. The fallback levels are configured as follows:

In a first fallback level, when an electrical failure is detected in one of the components of the two service brake circuits 2a, 2b, pneumatic redundancy ports 12a, 12b are automatically activated in the respective pressure modulator 9a, 9b. These cause the respective pressure modulator 9a, 9b to be no longer able to be actuated electrically via the service-brake control signals Sa, Sb, rather only pneumatically as a function of a specified redundancy pressure pRa, pRb which is present at the respective pneumatic redundancy port 12a, 12b. The specification of the respective redundancy pressure pRa, pRb is carried out differently per axle according to FIG. 1a.

Accordingly, in the rear-axle service brake circuit 2b a rear-axle service-brake control pressure pSb, which is applied by the service-brake valve 13 is output as a rear-axle redundancy pressure pRb, to the pneumatic rear-axle redundancy port 12b via a pneumatic line. The service brake valve 13 applies the rear-axle service-brake control pressure pSb here as a function of the service-brake braking specification VB which is specified manually by the driver, so that the same braking is requested pneumatically by means of the rear-axle service-brake control pressure pSb as via the rear-axle service-brake control signal Sb.

In the front-axle service brake circuit 2a it is possible to specify as a front-axle redundancy pressure pRa, e.g. a front-axle service-brake control pressure pSa which is also applied by the service-brake brake valve 13 according to the service-brake braking specification VB, wherein said front-axle service-brake control pressure pSa is, in contrast to the rear-axle service brake circuit 2b, not output directly to the front-axle pressure modulator 9a or the pneumatic front-axle redundancy port 12a thereof. Instead, a front-axle switching valve 14a is arranged upstream of the pneumatic front-axle redundancy port 12a, which front-axle switching valve 14a can be switched into two switching-valve switched positions X1, X2. For the sake of clarity, the reference symbols which are used below for the components of the front-axle switching valve 14a are not illustrated in FIG. 1a. Instead, reference is made to the view of the detail in FIGS. 2a and 2b.

The front-axle switching valve 14a has a first front-axle switching valve input 14a1, a second front-axle switching valve input 14a2 and a front-axle switching-valve output 14a3, wherein the front-axle switching-valve output 14a3 is connected to the pneumatic front-axle redundancy port 12a on the front-axle pressure modulator 9a and the first front-axle switching-valve input 14a1 is connected to the service brake valve 13. If the front-axle switching valve 14a is in its first switching-valve switched position X1, the front-axle service-brake control pressure pSa which is specified by the service brake valve 13 and is present at the first front-axle switching-valve input 14a1 is passed through to the pneumatic front-axle redundancy port 12a, so that in this first switching-valve switched position X1 the pneumatically specified service-brake braking specification VB of the driver is implemented by the front-axle pressure modulator 9a in that the front-axle service-brake control pressure pSa is output with an increased air quantity to the service brakes 3 of the front axle 6a.

The service-brake braking specification VB, i.e. a specific specified vehicle setpoint deceleration zSoll, which is specified by the driver by means of the service brake valve 13, can therefore be implemented by the respective pressure modulator 9a, 9b during normal operation as a function of the service-brake control signals Sa, Sb which are output electronically by the service-brake control module 10 or in the first fallback level as a function of the service-brake control pressures pSa, pSb which are applied directly in a pneumatic fashion by the service-brake valve 13.

The second front-axle switching valve input 14a2 of the front-axle switching valve 14a is connected to a trailer control valve 15 via a redundancy pressure line 21. As a result, in the second switching-valve switched position X2 of the front-axle switching valve 14a a redundancy control pressure pSR, which is output from a redundancy output 16 of the trailer control valve 15, can be passed through as a front-axle redundancy pressure pRa to the pneumatic front-axle redundancy port 12a of the front-axle pressure modulator 9a. As a result, the service brakes 3 on the front axle 6a can be additionally supplied with a front-axle brake pressure pBa which is dependent on the redundancy control pressure pSR. This permits a second fallback level to be formed as follows:

The specification of the redundancy control pressure pSR by the trailer control valve 15 can take place basically as a function of different paths:

According to FIG. 1a, e.g. the front-axle service-brake control pressure pSa, which is applied directly by the service brake valve 13 as a function of the service-brake braking specification VB, can be fed to the trailer control valve 15 via a first trailer control valve input 17a via a pressure line. In the trailer control valve 15, said front-axle service-brake control pressure pSa is output, having been increased in terms of air quantity and subsequently as a redundancy control pressure pSR, to the redundancy output 16, wherein the increasing of the air quantity takes place with the pressure medium from the parking-brake pressure medium reservoir 5c, which pressure medium is also fed to the trailer control valve 15. The redundancy control pressure pSR which is generated in the trailer control valve 15 can moreover be output to a possibly coupled trailer 200 via the redundancy output 16 as a trailer control pressure pT in order also to brake said trailer 200 as a function of the service-brake braking specification VB by the driver.

An additional supply pressure output 16V on the trailer control valve 15 serves here to transmit the pressure medium from the parking-brake pressure medium reservoir 5c to the trailer 200, wherein the reservoir pressure output 16V corresponds to the "red coupling head" of a conventional trailer control valve. The redundancy output 16 accordingly corresponds to the "yellow coupling head".

Furthermore, electrical specification of the service-brake braking specification VB to the trailer control valve 15 can take place via a second trailer control valve input 17b, wherein the electrical braking specification according to this embodiment takes place via a first redundancy control signal ST1 which is output by the service-brake control module 10 and is formed as a function of the vehicle setpoint deceleration zSoll. The first redundancy control signal ST1 is transmitted to a trailer control module 28 and a pilot control module 29 in the trailer control valve 15 via the second trailer control valve input 17b and actuates said valve as a function of the first redundancy control signal ST1 in such a way that, by opening and closing pressure valves in the pilot control module 29 with the pressure medium from the parking-brake pressure medium reservoir 5c, a pressure which corresponds to the service-brake braking specification VB is generated, said pressure being output as a redundancy control pressure pSR at the redundancy output 16. Therefore, a service-brake braking specification VB which is processed electrically beforehand via the service-brake control module 10 can also be transferred, as a trailer control pressure pT corresponding to the redundancy control pressure pSR, to a possibly coupled trailer 200 via the trailer control valve 15.

A third trailer control valve input 17c on the trailer control valve 15 is connected via a pressure line to a parking-brake control module 18 which generates, in the parking brake circuit 7, a parking-brake brake pressure pPH, for example as a function of a parking-brake braking specification VP which is specified manually by the driver via a parking-brake activation device 19, and outputs this parking-brake brake pressure, or a control pressure, which is dependent thereon, to the spring-loaded brakes 8, so that a certain braking effect can be achieved on the rear axle 6b via the spring-loaded brakes 8. For this purpose, according to FIG. 1a, when a parking-brake braking specification VP is present, the parking-brake activation device 19 outputs, in an electronic fashion, a parking-brake activation signal S2 to the parking brake control module 18. Within the scope of this parking braking process, just one complete opening process or application process of the spring-loaded brakes 8 is provided here. For example, such a parking-brake control module 18 is described in DE 10 2015 008 377 A1, the content of which is hereby included in its entirety through reference.

Furthermore, the assistance braking specification VA which is specified in an automated fashion can also be transmitted via the CAN bus 20 or the assistance control signal SAss to the parking brake control module 18 and also be implemented by the latter, for example within the scope of a braking function which is specified in an automated fashion or an emergency braking function which is specified in an automated fashion or a parking brake function which is specified in an automated fashion. For this purpose, the parking-brake brake pressure pPH is generated by the parking-brake control module 18 as a function of this assistance braking specification VP which is specified in an automated fashion, and said parking-brake brake pressure pPH applied to the spring-loaded brakes 8, in order also to be able to bring about an assisting braking process during travel, or to bring about parking via the parking brake circuit 7 and the spring-loaded brakes 8 in the stationary state. Within the scope of the above a graduated braking process is also possible in the parking brake circuit 7.

Furthermore, the assistance brake specification VA which is specified in an automated fashion can be transmitted from the CAN bus 20 to the trailer control valve 15 via a fourth trailer control valve input 17d. In the trailer control valve 15, the redundancy control pressure pSR is generated on the basis of the assistance braking specification VA, under the control of the trailer control module 28 via the pilot control module 29, and is output to the redundancy output 16, in order to implement a braking operation, requested in an automated fashion, in the vehicle 100 and/or in the trailer 200.

The energy supply is provided via two energy sources 11a, 11b, wherein the parking-brake control module 18 and the trailer control valve 15 are connected to a second energy source 11b which is independent of the first energy source 11a, so that the service brake circuits 2a, 2b and the parking brake circuit 7 and the trailer control valve 15 are operated energetically independently of one another. In the event of a failure of the first energy source 11a, at least the assistance braking specification VA and the parking-brake braking specification VP can therefore be specified and applied via the parking brake circuit 7 and the trailer control valve 15. The independence of the energy sources 11a, 11b can be ensured here either by virtue of the fact that energy sources 11a, 11b which are separate from one another are used or else galvanic isolation occurs between the energy sources 11a, 11b.

In the event of a failure of the first energy source 11a or of the electrical components of the service brake circuits 2a, 2b, i.e. in the event of it being no longer possible to apply a service-brake brake pressure pBa, pBb according to the electrical specification Sa, Sb or by means of the service-brake control module 10 and by means of the pressure modulators 9a, 9b, the described structure of the electronic brake system 1 according to FIG. 1a also permits implementation of a braking specification as follows, in order to compensate for the failure of the service brake circuits 2a, 2b:

As already described, in the first fallback level a service-brake braking specification VB which is specified by the driver pneumatically via the service brake valve 13 can be specified, through corresponding switching of the front-axle switching valve 14a into the first switching-valve switched position X1, to the pneumatic front-axle redundancy port 12a of the front-axle pressure modulator 9a and furthermore also directly to the pneumatic rear-axle redundancy port 12b of the rear-axle pressure modulator 9b. Therefore, in the event of an electrical failure the service-brake braking specification VB specified by the driver can still be brought about redundantly via the service brakes 3 on both vehicle axles 6a, 6b.

In a second fallback level, which intervenes if the driver is not available when there is an electrical failure of the service brake circuits 2a, 2b, since said driver is e.g. inattentive, or is not in place when there are relatively highly automated driving maneuvers, the assistance braking specification VA which is specified in an automated fashion can also be implemented by the service brakes 3 on at least one vehicle axle 6a, 6b. This case can occur, for example, when the vehicle 100 is travelling under automated control, in which case the assistance braking specification VA is specified, for example in the form of the vehicle setpoint deceleration, by the assistance control module 35 via the CAN bus 20.

The automated engagement occurs then by virtue of the fact that when an electrical failure is detected, for example in the first energy source 11a or the service-brake control module 10 or the pressure modulators 9a, 9b, the assistance braking specification VA which is specified in an automated fashion and is to be brought about via the service brake circuits 2a, 2b is processed by the trailer control module 28 arranged in the trailer control valve 15 instead of by the service-brake control module 10. That is to say the assistance braking specification VA which is transmitted via the assistance control signal SAss or the vehicle setpoint deceleration zSoll is no longer processed, as during normal operation, by the service-brake control module 10 and implemented via the latter by the service brakes 3 in the service brake circuits 2a, 2b. The electrical failure can be detected here, for example, within the scope of self-diagnostics by the service-brake control module 10, and can be signaled in a corresponding way, e.g. via a diagnostics signal SD or a corresponding message on the CAN bus 20.

The trailer control module 28 generates the redundancy control pressure pSR via the pilot control module 29, as a function of the assistance control signal SAss or the specified vehicle setpoint deceleration zSoll and said redundancy control pressure pSR is output, if appropriate, increased in terms of air quantity, via the redundancy output 16. The redundancy control pressure pSR is fed via the redundancy pressure line 21 to the second front-axle switching valve input 14a2 of the front-axle switching valve 14a and, at the same time, as a trailer control pressure pT to a possibly coupled trailer 200. In the second switching-valve switched position X2 of the front-axle switching valve 14a, the redundancy control pressure pSR can therefore be fed as a front-axle redundancy pressure pRa to the pneumatic front-axle redundancy port 12a, and via the latter the assistance braking specification VA which is specified in an automated fashion can be effected redundantly on the front axle 6a via the service brakes 3 and/or also on the trailer 200, even without the presence of a driver's request.

Therefore, in the second fallback level the implementation of an assistance braking specification VA, specified in an automated fashion, via at least one service brake circuit 2a, 2b and/or the trailer 200 is also possible. In this second fallback level, the trailer control module 28 performs here the implementation of the braking which is specified in an automated fashion.

In order to be able to have recourse to the two described fallback levels, corresponding switching of the front-axle switching valve 14a is necessary. According to FIGS. 2a and 2b, the front-axle switching valve 14a can be embodied for this purpose as a shuttle valve 40a (FIG. 2a) or as a 3/2-way valve 40b (FIG. 2b). The two valves 40a, 40b each have two front-axle switching valve inputs 14a1, 14a2 as well as a front-axle switching valve output 14a3 which, as described, are made to extend in a pressure-conducting fashion to the corresponding components of the front-axle brake circuit 2a of the brake system 1. The method of functioning of the illustrated valves 40a, 40b differs as follows:

The shuttle valve 40a, also referred to as "select high valve" passes on the respective higher pressure of the pressures present at the two front-axle switching-valve inputs 14a1, 14a2 to the front-axle switching-valve output 14a3. In the embodiment according to FIG. 1a, therefore either the front-axle service-brake control pressure pSa which is output by the service brake valve 13 or the redundancy control pressure pSR which is output by the trailer control valve 15 is conducted as front-axle redundancy pressure pRa to the pneumatic front-axle redundancy port 12a of the front-axle pressure modulator 9a depending on which of the two pressures pSa, pSR is higher.

If a manually specified service-brake braking specification VB by the driver via the service brake valve 13 is present and if this service-brake braking specification VB gives rise to a higher applied pressure value for the front-axle service-brake control pressure pSa than the parking-brake brake pressure pPH which is applied by the parking-brake control module 18 and which is applied on the basis of an assistant braking specification VA which is requested in an automated fashion via the assistance control signal SAss and is conducted as a redundancy control pressure pSR to the shuttle valve 40a, the shuttle valve 40a is switched automatically into the first switching-valve switched position X1, and the manually specified service-brake braking specification VB is implemented on the front axle 6a via the service brakes 3. However, if the driver is attentive or not in place or does not intervene manually in the braking and if automatic braking is requested via the assistance control signal SAss, the front-axle service-brake control pressure pSa is accordingly always lower than the parking-brake brake pressure pPH or the redundancy control pressure pSR, so that the shuttle valve 40a goes automatically into the second switching-valve switched position X2, and the assistance braking specification VA which is specified in an automated fashion is implemented via the service brakes 3 on the front axle 3.

According to FIG. 2b, the front-axle switching valve 14a is embodied as a 3/2-way valve 40b which can be moved into the respective switching-valve switched position X1, X2 under electrical control via a switching signal SU, and therefore either the first front-axle switching valve input 14a1 (X1) or the second front-axle switching valve input 14a2 (X2) is connected to the front-axle switching-valve output 14a3. The switching-signal SU can be generated and output, for example, by the parking-brake control module 18 or else also the trailer control valve 15, in order to specify the switching-valve switched position X1, X2 electrically.

Figure 2A:
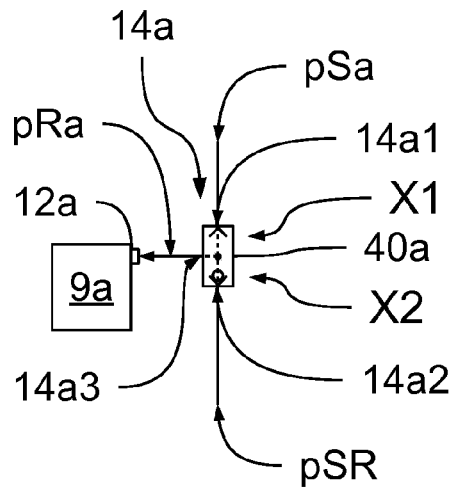
FIGS. 2a, b, c, d, and e show various embodiments of switching valves in a brake system according to FIG. 1.
Figure 2B:
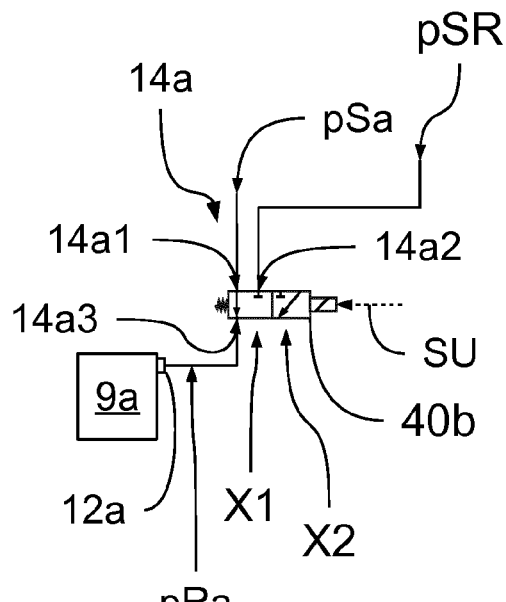
Figure 2C:
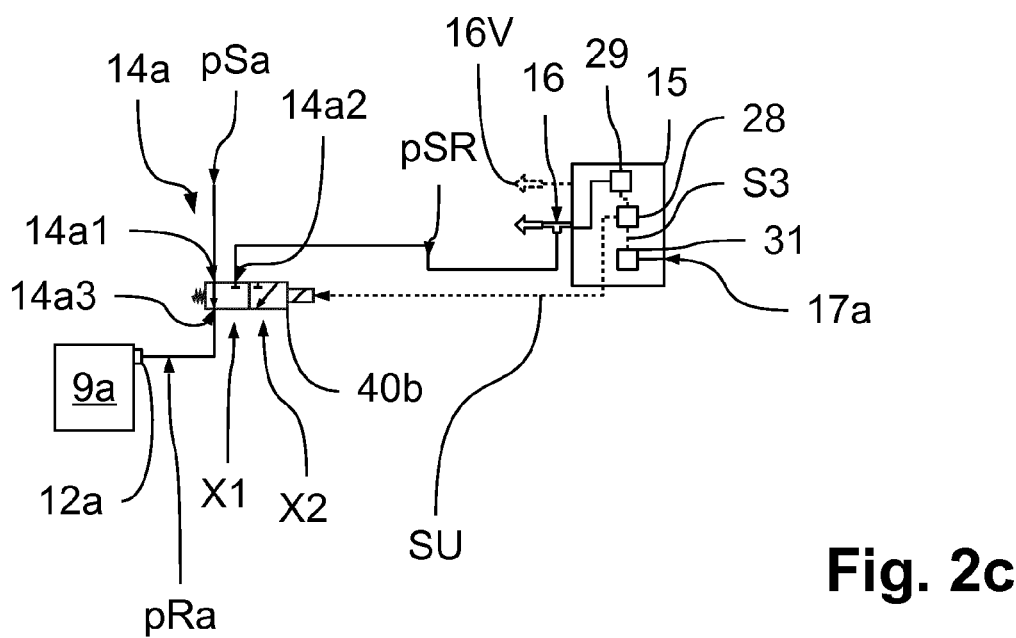

According to one embodiment which is illustrated in FIG. 2c, there can be provision to arrange e.g. in the trailer control valve 15—if appropriate also directly on the service brake valve 13—a pressure sensor 31 which measures the front-axle service-brake control pressure pSa specified to the first trailer control valve input 17a, and accordingly detects whether a service-brake braking specification VB by the driver is present. The pressure sensor 31 outputs a braking request signal S3, for example, to the trailer control module 28 for processing, and the trailer control module 28 subsequently outputs a corresponding switching signal SU which switches the 3/2-way valve 40b into the first switching position X1 in a controlled manner if a service-brake braking specification VB which is present is signaled via the braking request signal S3, so that the service-brake braking specification VB which is pneumatically specified by the service brake valve 13 is conducted from the 3/2-way valve 40b to the front-axle redundancy port 12a, and is converted by the front-axle pressure modulator 9a into a corresponding front-axle service-brake brake pressure pBa.

With the switching valves 40a, 40b which are disclosed in FIGS. 2a, 2b, 2c it is therefore possible to specify in an automated or actively controlled fashion in the brake system 1 according to FIG. 1a which front-axle redundancy pressure pRa is present at the pneumatic front-axle redundancy port 12a and accordingly which redundant braking is to be implemented on the front axle 6a via the service brakes 3: the service-brake braking specification VB or the assistance braking specification VA which is specified in an automated fashion.

The shuttle valve 40a here has the advantage that in any situation the driver can automatically override the assistance braking specification VA which is specified in an automated fashion via the trailer control valve 15, so that the service-brake braking specification VB, i.e. a braking process which is requested by the driver, can always be given a higher priority in comparison with a braking process which is requested in an automated fashion if the driver requests stronger braking. This higher priority can also be allocated an actively controlled 3/2-way valve 40*b* in the exemplary embodiments illustrated in FIG. 2*c* in that, when a driver braking process is present and is sensed e.g. via the pressure sensor 31, switching over into the first switching-valve switched position X1 takes place via the switching signal SU. However, such switching with the 3/2-way valve 40*b* occurs only if particularly stronger braking is not already implemented at the respective time in the second switching-valve switched position X2. In order to avoid bringing about an unsafe driving state or some other kind of dangerous situation as a result of the switching, the other braking process is firstly ended in an uncontrolled fashion, and only then is switching over into the first switching-valve switched position X1 carried out.

Figure 2E:
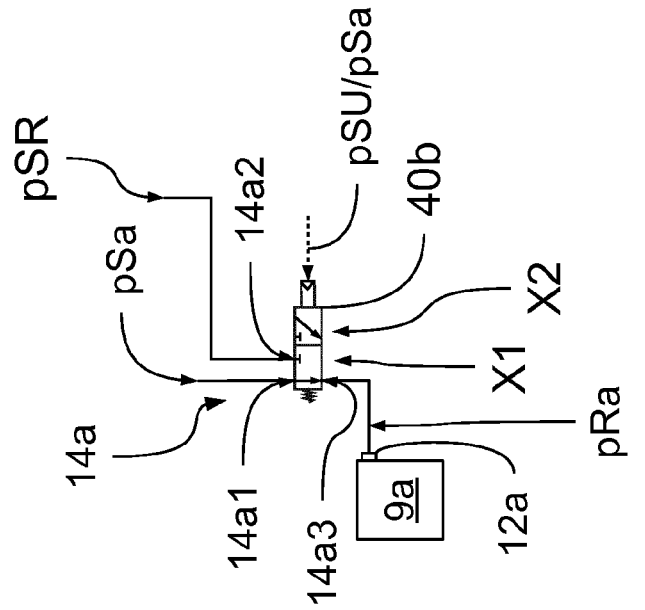
Figure 2D:
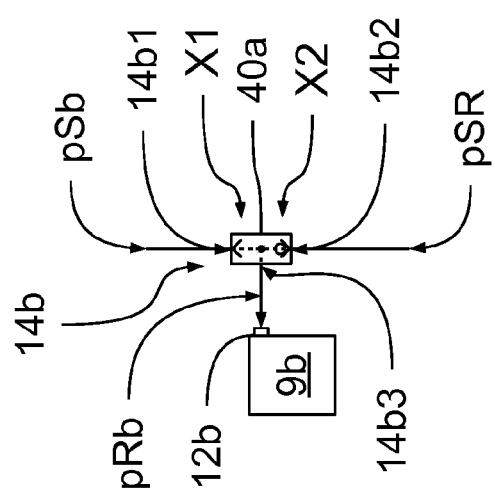

Such a switching valve 40*a*, 40*b*—as is illustrated in FIG. 2*d* as representative of the shuttle valve 40*a*—can basically also be arranged upstream on the rear axle 6*b* or on the pneumatic rear-axle redundancy port 12*b*, in order also to detect the rear-axle redundancy pressure pRb as a function of the driver's request VB or according to the assistance braking specification VA if an electrical failure occurs. Accordingly, a rear-axle switching valve 14*b* is provided with a first rear-axle switching-valve input 14*b*1 and a second rear-axle switching-valve input 14*b*2 which, depending on the switching-valve switched position X1, X2, conduct the rear-axle service-brake control pressure pSb or the redundancy control pressure pSR to a rear-axle switching-valve output 14*b*3.

The structural configuration in the electrically controlled brake system 1 is in this case comparable with an arrangement on the front axle 6*a*, so that the redundant actuation via the rear-axle switching valve 14*b* can take place in an analogous fashion. When a rear-axle switching valve 14*b* is used, all that has to be ensured is that in the respective fallback levels the spring-loaded brakes 8 are not applied by the parking-brake control module 18 at the same time as the service brakes 3 on the rear axle 6*b*, in order to avoid bringing about a superimposed braking effect on the rear axle 6*b* as a result of the simultaneous activation of the two brakes 3, 8 on the rear axle 6*b*. This can be done, for example by means of a corresponding open-loop and closed-loop control process in the parking-brake control module 18.

Therefore, in the event of an electrical failure in the service brakes 2*a*, 2*b*, both vehicle axles 6*a*, 6*b* can still be braked under the control of the trailer control module 28 via the service brakes 3.

According to FIG. 2*e*, a pneumatically controllable 3/2-way valve 40*b* is illustrated by way of example as a front-axle switching valve 14*a*. A switching control pressure pSU can be fed to said 3/2-way valve 40*b* pneumatically, said switching control pressure pSU being provided by means of the front-axle service-brake control pressure pSa or a pressure which is proportional thereto. The first switching-valve switched position X1 can be set as a function of the level of the switching control pressure pSU to output the driver's request as a redundant braking request to the respective service brake circuit 2*a*, 2*b*.

Figure 3:
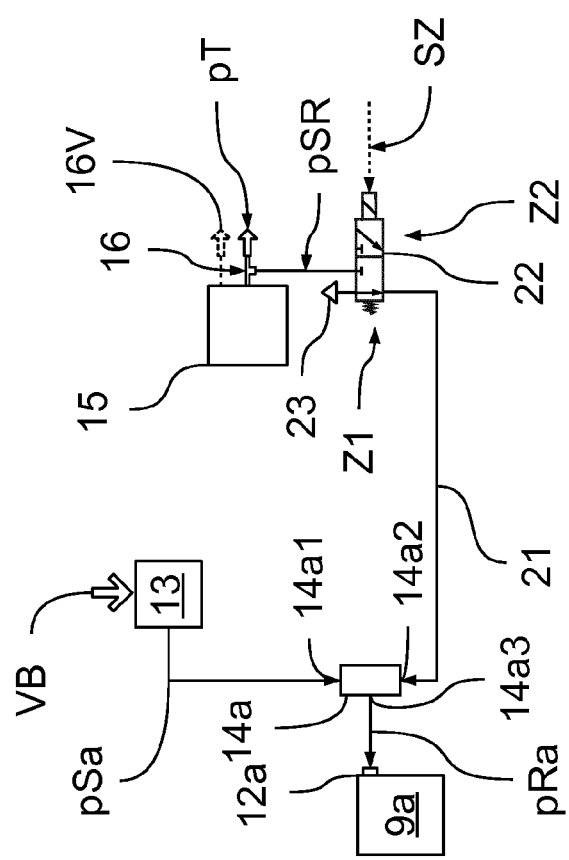
FIG. 3 shows the brake system according to FIG. 1 with a shutoff valve for implementing a shutoff function.

According to FIG. 3, a further embodiment of the brake system 1 is illustrated, wherein in addition a shutoff valve 22 is provided which is arranged in the redundancy pressure line 21 between the trailer control valve 15 or the redundancy output 16 and the front-axle switching valve 14*a*. For the sake of clarity, only the relevant part of the brake system 1 is illustrated in order to clarify the function of the additional shutoff valve 22. All the further components of the brake system 1 are identical to the embodiment shown in FIG. 1*a*.

The shutoff valve 22 is embodied as an electrically controllable 3/2-way valve which can be switched between two shutoff valve switched positions Z1, Z2 as a function of a shutoff signal SZ. In a first shutoff valve switched position Z1 the redundancy pressure line 21 is connected to a bleeding portion 23, so that the redundancy control pressure pSR is not transmitted from the trailer control valve 15 to the front-axle switching valve 14*a*. The second front-axle switching-valve input 14*a*2 is accordingly pressureless. When the front-axle switching valve 14*a* is switched into the second switching-valve switched position X2, the service brakes 3 on the front axle 6*a* therefore also remain pressureless and are therefore not applied. Redundant implementation of an assistance braking specification VA, which is specified in an automated fashion, via the service brakes 3 of the front axle 6*a* in the second fallback level is therefore not possible when the first shutoff-valve switched position Z1 has been set.

In a second shutoff-valve switched position Z2 of the shutoff valve 22, the redundancy pressure line 21 is connected in a pressure-conducting fashion to the redundancy output 16, so that, as in the brake system 1 according to FIG. 1*a*, redundant operation according to the above description can take place in that the redundancy control pressure pSR is also conducted according to the assistance braking specification VA to the front-axle switching valve 14*a* in the second fallback level.

The respective shutoff-valve switched position Z1, Z2 is specified here by the trailer control module 28 via the shutoff signal SZ so that it can be specified whether and when there is to be redundant intervention in the second fallback level. The shutoff function can be advantageous, for example, when the vehicle 100 is shut down for a relatively long time period and accordingly it is not absolutely necessary to brake the vehicle 100 via the front axle 6*a*, since the vehicle 100 is already kept in a stationary state in an automated fashion via the spring-loaded brakes 8 and, if appropriate, the trailer 200. By switching into the first shutoff-valve switched position Z1 in such a situation it is possible, for example to prevent a situation in which, when there are possible leaks in the service brakes 3, the pressure medium can escape if said service brakes 3 are continuously applied with a service-brake brake pressure pBa, pBb in the stationary state.

If the switching valve 14*a* in FIG. 3 is embodied as a 3/2-way valve 40*b*, the shutoff function can also already be implemented by means of the switching valve 14*a* in that in the stationary state or when the vehicle is shut down for a lengthy time the first switching-valve switched position X1, which corresponds in this case to the first shutoff-valve switched position Z1, is set. Unless there is a driver activation, the first switching valve input 14*a*1 will accordingly be as it were bled via the service brake valve 13, which corresponds in FIG. 3 to the connection of the redundancy pressure line 21 to the bleeding portion 23. Therefore, in such an embodiment the shutoff function can take place only with the 3/2-way valve 40*b* as a switching valve 14*a* unless there is an additional valve.

Figure 1B:
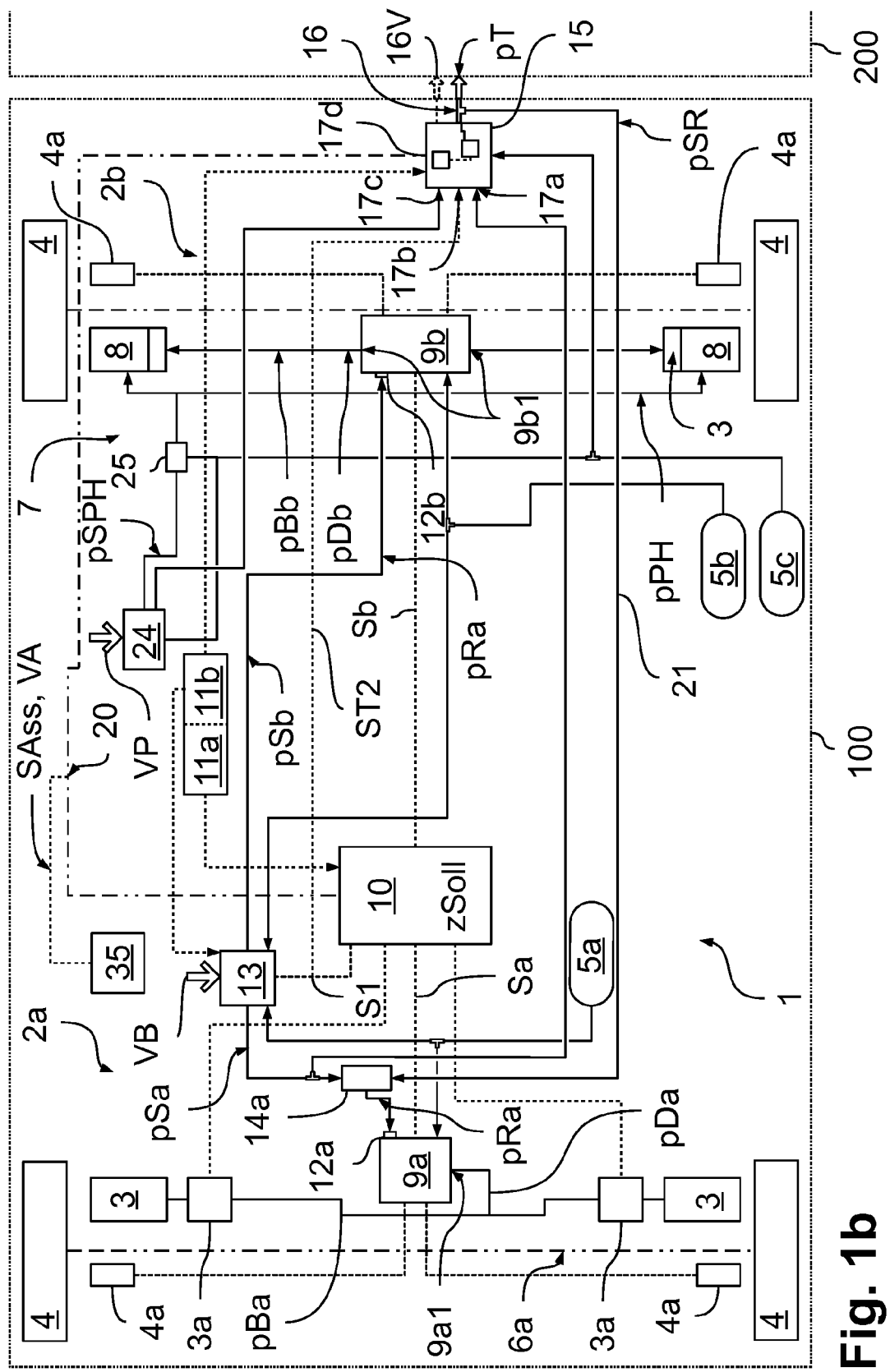

According to FIG. 1*b*, a further embodiment of the electrically controllable brake system 1 is illustrated, wherein this embodiment differs from the brake system 1 according to FIG. 1*a* by virtue of the fact that the parking brake circuit 7 is not formed by an electrically controlled parking brake but rather by a pneumatically controlled parking brake. Accordingly, in this embodiment there is no provision of a parking-brake control module 18. In order to be able to bring about a braking operation in this parking brake circuit 7, the driver has to manually specify a parking-brake braking specification VP via a parking brake valve 24 which applies a parking-brake control pressure pSPH, corresponding to the parking-brake braking specification VP, to a relay valve 25. The relay valve 25 ensures that the quantity of air is increased and outputs this parking-brake control pressure pSPH with an increased quantity of air, as a parking-brake brake pressure pPH, to the spring-loaded brakes 8, in order to bring about corresponding braking at the latter.

The parking-brake control pressure pSPH which is output by the parking brake valve 24 or a pressure which is associated therewith may additionally be transmitted to the third trailer control valve input 17c of the trailer control valve 15, in order to be able to transmit the parking brake specification VP to the trailer 200 and moreover to ensure a parking brake function.

Figure 1C:
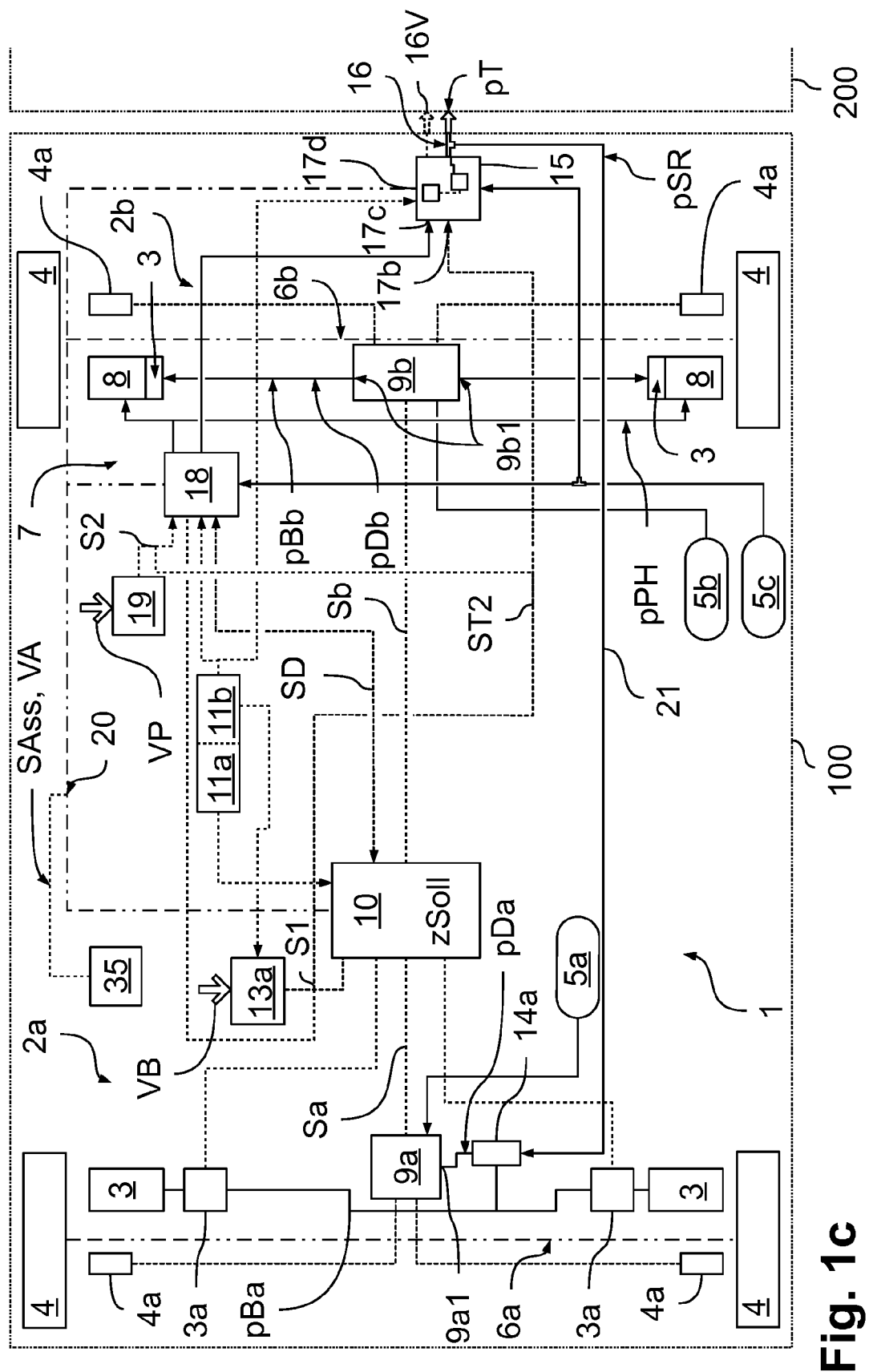

According to FIG. 1c, a further embodiment of the electronically controllable brake system 1 is illustrated, wherein in contrast to the embodiment in FIG. 1a, the pressure modulators 9a, 9b do not have a pneumatic redundancy port 12a, 12b, i.e. a pressure-modulator output pressure pDa, pDb is output in a purely electrically controlled fashion to the respective service brakes 3 by the pressure modulators 9a, 9b. Therefore, it is not possible to form a fallback level by virtue of the fact that in the event of electrical failure a redundancy pressure pRa, pRb is fed to the respective pressure modulator 9a, 9b. Accordingly, the service-brake brake device 13a which is embodied in a purely electrical fashion in this case also does not output a service-brake control pressure pSa, pSb to the respective vehicle axle 6a, 6b, and the service-brake braking specification VB is transmitted by the electric service-brake brake device 13a in a purely electrical fashion via the service-brake activation signal S1. Furthermore, the first trailer control valve input 17a on the trailer control valve 15 is no longer controlled with the front-axle service-brake control pressure pSa.

So that braking via the service brakes 3 can still be made possible in the event of electrical failure, there is provision for the front-axle switching valve 14a to be arranged in the pressure path downstream of the front-axle pressure-modulator output 9a1 of the front-axle pressure modulator 9a. The first front-axle switching-valve input 14a1 of the front-axle switching valve 14a is accordingly connected to the front-axle pressure-modulator output 9a1 so that the front-axle pressure-modulator output pressure pDa which is output by the front-axle pressure modulator 9a is fed to the first front-axle switching-valve input 14a1. As in the embodiment according to FIG. 1a, the redundancy control pressure pSR is present at the second front-axle switching-valve input 14a2 via the redundancy pressure line 21.

Therefore, the brake system 1 is changed in such a way that in the case of redundancy the redundancy control pressure pSR which is output by the trailer control valve 15 in the second switching-valve switched position X2 is not fed into the front-axle service brake circuit 2a upstream of the front-axle pressure modulator 9a but rather downstream thereof. The redundancy control pressure pSR is therefore used directly as a front-axle service-brake pressure pBa in the second switching-valve switched position X2. In order to specify an appropriate quantity of air to the service brakes 3 of the front axle 6a in this case, an additional increase in the quantity of air of the redundancy control pressure pSR can be additionally provided, e.g. via an additional relay valve (not illustrated) in the redundancy pressure line 21.

In the first switching-valve switched position X1 which is set during normal operation, according to FIG. 1c, the front-axle pressure-modulator output pressure pDa is used as a front-axle service-brake pressure pBa, i.e. braking which is controlled by the service-brake control module 10 occurs according to the service-brake braking specification VB or according to an assistance braking specification VA which is specified in an automated fashion to the service-brake control module 10. Therefore, the first switching-valve switched position X1 is set on a standard basis, and in the event of an electrical failure in the service brake circuits 2a, 2b, the second switching-valve switched position X2 is switched to.

The first fallback level which in the event of an electronic failure of the first energy source 11a is brought about in the embodiment according to FIG. 1a by virtue of the fact that a service-brake control pressure pSa is output to the pneumatic front-axle redundancy port 12a via the service brake valve 13 and via the front-axle switching valve 14a in the first switching-valve switched position X1 under manual control by the driver is eliminated from this exemplary embodiment according to FIG. 1c since there is no pneumatically controlled redundancy in the pressure modulators 9a, 9b.

A redundant driver intervention on the front axle 6a via the service brakes 3 can, however, occur in this exemplary embodiment by virtue of the fact that the driver specifies a service-brake braking specification VB manually via the electric service brake braking device 13a. Via a second redundancy control signal ST2, this service-brake braking specification VB is for example transmitted via a direct connection or via a further (bus) network, which differs from the CAN bus 20, via the second trailer control valve input 17b, to the trailer control valve 15 and converted therein, under control by the trailer control module 28 and the pilot control module 29, into a redundancy control pressure pSR which is diverted to the front-axle switching valve 14a via the redundancy pressure line 21 and can be transmitted as a trailer control pressure pT to a trailer 200, as already described with respect to the embodiment according to FIG. 1a. The electric service-brake brake device 13a must also be provided redundantly with energy for this purpose by the second energy source 11b, in order to ensure that the service-brake activation signals S1 are output to the trailer control valve 15 if there is an electrical failure in the service brake circuits 2a, 2b and, at the same time, for example in the first energy source 11a. In addition, the parking-brake braking specification VP or the parking-brake activation signal S2 can also be transmitted via the second redundancy control signal ST2.

In the exemplary embodiment according to FIG. 1c, e.g. the trailer control module 28 decides whether the manually requested service-brake braking specification VB or the assistance braking specification VA or, if appropriate, also the parking-brake braking specification VP is to be used for redundant intervention in the service brake circuits 2a, 2b, for example as a function of whether the higher priority is to be allocated to the driver braking specification VB, VP. The second fallback level, in which in the event of an electrical failure of the service brake circuits 2a, 2b an assistance braking specification VA which is requested in an automated fashion is diverted to the service brakes 3 of the front axle 6a via the trailer control valve 15, is, according to this embodiment, essentially identical to the previous embodiments in FIGS. 1a and 1b. Only the position of the feeding in of the redundancy control pressure pSR which is specified by the automated assistance braking specification VA has shifted, as already described.

According to this embodiment, the front-axle switching valve 14a can also be embodied as a shuttle valve 40a or as a 3/2-way valve 40b, as shown in FIG. 2a or FIG. 2b, in order to be able to switch the switching-valve switched position X1, X2 automatically or in an actively controlled fashion. Since in this exemplary embodiment the decision whether the driver braking operation VB or the assistance braking specification VP is to be applied takes place electronically in the trailer control valve 15, the embodiment according to FIG. 2c, i.e. with an additional pressure sensor 31, is not necessary.

Furthermore, in FIG. 1c it is also possible to provide additionally a rear-axle switching valve 14b on the rear axle 6b—as indicated in FIG. 2d—in order to be able to actuate the service brakes 3 on the rear axle 6b via the trailer control valve 15, in an analogous fashion to those on the front axle 6a, in the event of an electronic failure. The shutoff valve 22 according to FIG. 3, which releases the redundancy control pressure pSR in the redundancy pressure line 21, can also be used in this embodiment in order, for example, to avoid application of the service brakes 3 on the front axle 6a when the vehicle 100 is shut down for a lengthy period, if this is desired.

In all the described embodiments of the brake system 1 it is therefore ensured that in the event of an electrical failure in at least one of the service brake circuits 2a, 2b, i.e. in the event of the pressure modulators 9a, 9b not being able to apply a corresponding service-brake brake pressure pBa, pBb under electrical control by the service-brake control module 10, at least one fallback level is formed in which the service brakes 3 on the front axle 6a and/or on the rear axle 6b are actuated as a function of a service-brake braking specification VB which is specified manually, or of an assistance braking specification VA which is specified in an automated fashion, the redundant deceleration being controlled via the trailer control valve 15.

In the previous embodiments, the trailer control valve 15 is embodied essentially like a conventional trailer control valve with the corresponding trailer control valve inputs 17a, 17b, 17c, 17d and the redundancy output 16 which corresponds to the "yellow coupling head", and the supply pressure output 16V, which corresponds to the "red coupling head".

Therefore, in addition to a parking-brake brake pressure pPH which is applied in the parking-brake brake circuit 7 or a parking-brake control pressure pSPH or a pressure which is dependent thereon can be converted, preferably inverted, and subsequently output to the trailer 200 via the "yellow coupling head". In addition, there is therefore provision in FIGS. 1a, 1b and 1c to permit electrically redundant implementation via the trailer control module 28, and in this context to intervene with an integrated logic if at least one of the service brake circuits 2a, 2b has failed. The original function of conventional trailer control valve 15 is therefore retained, so that for this additional redundant functionality all that is necessary is to retrofit the trailer control module 28 which, however, as described can also ensure that the trailer control pressure pT is specified during normal operation.

Figure 4:
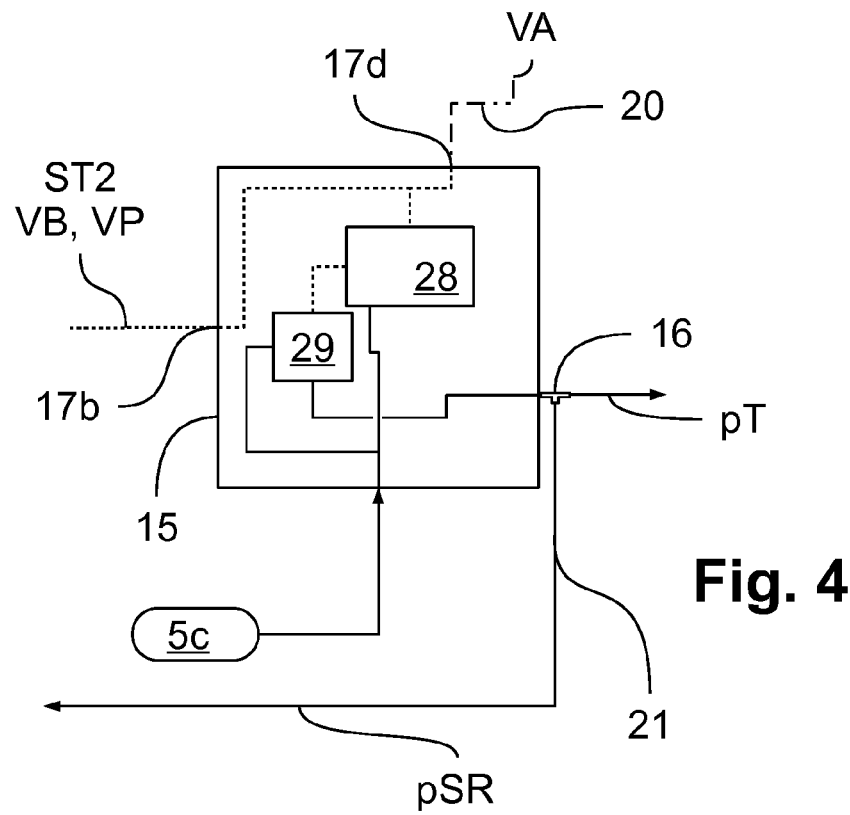
FIG. 4 shows a trailer control valve according to an embodiment.
Figure 5:
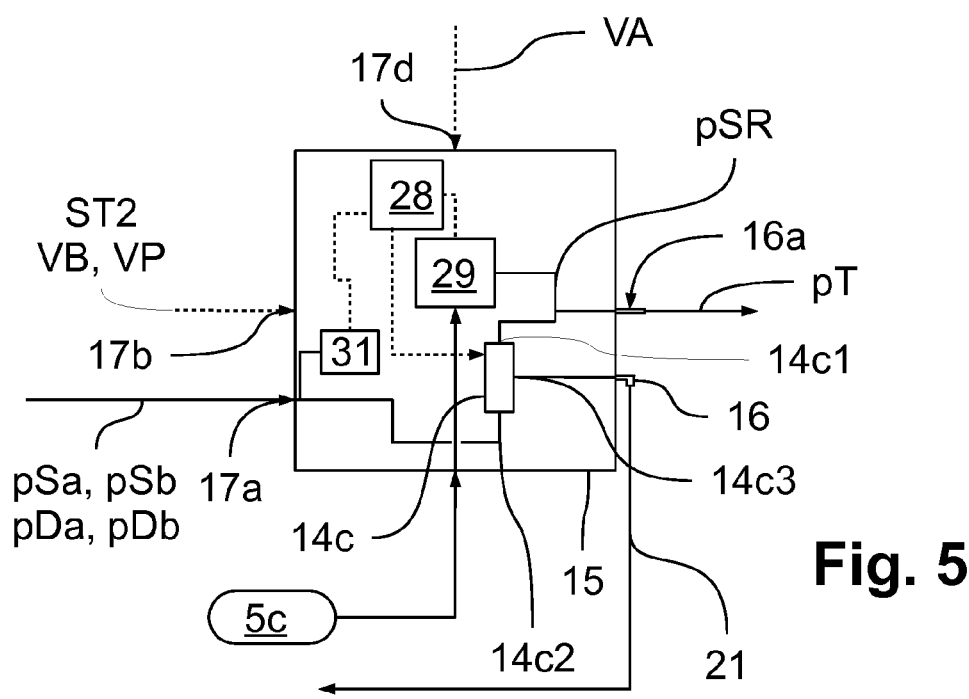
FIG. 5 shows a trailer control valve in an alternative embodiment.

A possible structure of the trailer control valve 15 for achieving this functionality is illustrated in detail in FIGS. 4 and 5. In one variant of the trailer control valve 15, which is illustrated in FIG. 4, there is provision, as described above, to generate the redundancy control pressure pSR electronically as a function of the parking-brake braking specification VP or service-brake braking specification VB which is transmitted via the second trailer control valve input 17b or an additional trailer control valve input of the trailer control valve 15, or as a function of the parking-brake activation signal S2 and/or of the service-brake activation signal S1 which is transmitted via a (bus) network which differs from the CAN bus 20 or via a direct connection from the service brake valve 13 or the electrical service-brake activation device 13a and/or by the parking-brake activation device 19 via the second redundancy control signal ST2. Furthermore, the assistance braking specification VA or the assistance control signal SAss which is transmitted in the vehicle 100 via the CAN bus 20 can be fed via a fourth trailer control valve input 17d. The trailer control module 28 generates, as a function of one of these braking specifications VA, VB, VP via the pilot control module 29 in the trailer control valve 15, the redundancy control pressure pSR which is output via the redundancy output 16 to the respective switching valve 14a, 14b in order to implement the braking operation with the service brakes 3 and/or as a trailer control pressure pT to a trailer 200.

According to a further embodiment of the trailer control valve 15 which is illustrated in FIG. 5, a redundancy switching valve 14c is integrated in the trailer control valve 15, wherein the redundancy switching valve 14c performs the same task and functionality as the switching valves 14a, 14b, specified in the preceding exemplary embodiments, on the respective vehicle axle 6a, 6b. The redundancy switching valve 14c can be embodied here, as also in the preceding embodiments, as a shuttle valve 40a (see FIG. 2a) or as an electrically controllable 3/2-way valve 40b (see FIGS. 2b and 2c). For the sake of clarity, only the components in the trailer control valve 15 which differ from the previous embodiments are illustrated in FIG. 5.

According to FIG. 5, there is accordingly provision to specify, to the redundancy switching valve 14c via a first redundancy switching-valve input 14c1, the service-brake control pressure pSa, pSb which is applied by the service brake valve 13 on the basis of the service-brake braking specification VB, said service-brake control pressure pSa, pSb being preferably the front-axle service-brake control pressure pSa which, as in the brake system 1 according to FIG. 1a, can be transmitted to the trailer control valve 15 via the first trailer control valve input 17a, in order to brake the trailer 200 as a function of the front-axle service-brake control pressure pSa. Alternatively, there can be provision, for the brake system 1 according to FIG. 1c in which a service-brake control pressure pSa, pSb is not specified by the in this case purely electric service-brake activation device 13a, that the pressure-modulator output pressure pDa, pDb which is generated by the respective pressure modulator 9a, 9b on the basis of the respective service-brake control signal Sa, Sb, is conducted to the first trailer control valve input 17a of the trailer control valve 15, and said pressure-modulator output pressure pDa, pDb is specified to the first redundancy switching-valve input 14c1.

The redundancy control pressure pSR which is generated by the pilot control module 29 in the trailer control valve 15 from the parking-brake pressure medium reservoir 5c is specified to a second redundancy switching-valve input 14c2 of the redundancy switching valve 14c as a function of the respective electronically specified braking specification VA, VB, VP. The generated redundancy control pressure pSR is subsequently transmitted to the second redundancy switching-valve input 14c2 as well as also to a trailer output 16a—i.e. the "yellow coupling head"—in order to be able to specify the latter as a trailer control pressure pT to a brake system with service brakes in the coupled trailer 200. According to this embodiment, the redundancy output 16 and the trailer output 16a therefore do not coincide as in the previous exemplary embodiments.

Depending on the switching-valve switched position X1, X2, the pressures pSR, pSa, pSb, pDa, pDb which are present at the redundancy switching-valve inputs 14c1, 14c2, are optionally output to a redundancy switching-valve output 14c3 of the redundancy switching valve 14c according to the system described above, i.e. in an automated fashion via the shuttle valve 40a or under active control via the 3/2-way valve 40b. The redundancy switching-valve output 14c3 is connected to the redundancy output 16 of the trailer control valve 15, which, in this embodiment is provided for outputting the pressure pSR, pSa, pSb, pDa, pDb, optionally output by the redundancy switching-valve output 14c3, for the actuation of the service brakes 3 via the pressure modulator 9a, 9b. In this embodiment of the trailer control valve 15, for this purpose the redundancy pressure line 21 is connected to the redundancy output 16, in order to ensure that the pressure pSR, pSa, pSb, pDa, pDb which is optionally output is fed via the latter analogously at the corresponding location into the at least one service brake circuit 2a, 2b.

If, accordingly, specification of the service-brake control pressure pSa, pSb, preferably of the front-axle service-brake control pressure pSa, is provided via the first trailer control valve input 17a of the trailer control valve 15, the redundancy pressure line 21 is to be connected directly to the redundancy port 12a, 12b of the respective pressure modulator 9a, 9b, preferably of the front-axle pressure modulator 9a, in order to use as the redundancy pressure pRa, pRb the pressure which is output at the redundancy output 16 of the trailer control valve 15—i.e. either the redundancy control pressure pSR or the respective service-brake control pressure pSa, pSb. If, on the other hand, the pressure-modulator output pressure pDa, pDb is specified to the first trailer control valve input 17a, the redundancy pressure line 21 is to be connected directly to the service brakes 3, in order to use the pressure present at the redundancy output 16—i.e. either the redundancy control pressure pSR or the pressure-modulator output pressure pDa, pDb—as the service-brake brake pressure pBa, pBb to actuate the service brakes 3.

Depending on whether only one of the vehicle axles 6a, 6b is to be redundantly braked via the corresponding service brake circuit 2a, 2b as a function of the redundancy control pressure pSR in the redundant braking mode, the redundancy pressure line 21 can also only ensure that the redundancy control pressure pSR is fed into one of the service brake circuits 2a, 2b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Brake system
2a Front-axle service brake circuit
2b Rear-axle service brake circuit
3 Service brakes
3a ABS control valves
4 Wheels
4a Wheel speed sensors
5a Front-axle pressure medium reservoir
5b Rear-axle pressure medium reservoir
5c Parking-brake pressure medium reservoir
6a Front axle
6b Rear axle
7 Parking brake circuit
8 Spring-loaded brakes
9a Front-axle pressure modulator
9a1 Front-axle pressure-modulator output
9b Rear-axle pressure modulator
9b1 Rear-axle pressure-modulator output
10 Service-brake control module
11a First energy source
11b Second energy source
12a Pneumatic front-axle redundancy port
12b Pneumatic rear-axle redundancy port
13 Service brake valve
13 Electronic service-brake activation device
14a Front-axle switching valve
14a1 First front-axle switching-valve input
14a2 Second front-axle switching-valve input
14a3 Front-axle switching-valve output
14b Rear-axle switching valve
14b1 First rear-axle switching-valve input
14b2 Second rear-axle switching-valve input
14b3 Rear-axle switching-valve output
15 Trailer control valve
16 Redundancy output
16a Trailer output
16V Reservoir pressure output
17a First trailer control valve input
17b Second trailer control valve input
17c Third trailer control valve input
17d Fourth trailer control valve input
18 Parking-brake control module
19 Parking-brake activation device
20 CAN bus
21 Redundancy pressure line
22 Shutoff valve
23 Bleeding port
24 Parking brake valve
25 Relay valve
28 Trailer control module
29 Pilot control module
31 Pressure
35 Assistance control module
40a Shuttle valve
40b 3/2-way valve 100 Vehicle
200 Trailer
pBa Front-axle brake pressure
pBb Rear-axle brake pressure
pDa Front-axle pressure-modulator output pressure
pDb Rear-axle pressure-modulator output pressure
pSR Redundancy control pressure
pPH Parking-brake control pressure
pRa Front-axle redundancy pressure
pRb Rear-axle redundancy pressure
pSa Front-axle service-brake control pressure
pSb Rear-axle service-brake control pressure
pSPH Parking-brake control pressure
pSU Switching control pressure
pT Trailer control pressure
S1 Service-brake activation signal
S2 Parking-brake activation signal
S3 Braking request signal
SAss Assistance control signal
Sa Front-axle service-brake control signal
Sb Rear-axle service-brake control signal
SD Diagnostic signal
ST1 First redundancy control signal
ST2 Second redundancy control signal
SU Switching signal
SZ Shutoff signal
VA Assistance braking specification
VB Service-brake braking specification
VP Parking-brake braking specification
X1 First switching-valve switched position
X2 Second switching-valve switched position
Z1 First shutoff-valve switched position
Z2 Second shutoff-valve switched position
zSoll Vehicle setpoint deceleration

The invention claimed is:

1. An electronically controllable brake system for a vehicle, the electronically controllable brake system comprising:
   at least one service brake circuit with service brakes and a service-brake control module, wherein a service-brake brake pressure can be fed to the service brakes, and the service-brake control module is configured to generate a service-brake control signal as a function of a braking specification, wherein the service-brake brake pressure can be generated as a function of the service-brake control signal and specified to the service brakes, for the implementation of the braking specification via the at least one service brake circuit, under electrical control, and
   a trailer control valve with a trailer control module, wherein the trailer control module is configured to receive and process an electronically communicated braking specification and the trailer control valve is configured to generate and output, under the control of the trailer control module, a redundancy control pressure as a function of the electronically communicated braking specification,
   wherein if implementation of the braking specification, under electrical control by the service-brake control module, via the at least one service brake circuit is prevented:
      the service-brake brake pressure can be generated as a function of the redundancy control pressure generated in the trailer control valve, and can be applied to the service brakes of the at least one service brake circuit, for redundant implementation of the braking specification in the vehicle, and/or
      a trailer control pressure can be generated as a function of the redundancy control pressure generated in the trailer control valve, and can be output to a trailer for the redundant implementation of the braking specification in the trailer.

2. The electronic controllable brake system as claimed in claim 1, wherein the trailer control pressure can be generated as a function of the redundancy control pressure generated in the trailer control valve and can be output to the trailer if implementation of the braking specification, under electrical control by the service-brake control module, via the at least one service circuit is possible, wherein the braking specification can be transmitted from the service-brake control module to the trailer control valve.

3. The electronically controllable brake system as claimed in claim 1, wherein the service-brake brake pressure in the at least one service brake circuit can only be applied to the service brakes of the at least one service brake circuit as a function of the redundancy control pressure generated in the trailer control valve, via the trailer control module if implementation of the braking specification via the at least one service brake circuit and the electrical control of service-brake control module is not possible.

4. The electronically controlled brake system as claimed in claim 1, wherein the braking specification is an assistance braking specification which is specified in an automated fashion by an assistance control module to the service-brake control module and/or the trailer control module, and/or a parking-brake braking specification which is specified manually via a parking-brake activation device or via a parking brake valve in a parking brake circuit and/or is a service-brake braking specification which can be specified manually via an electropneumatic service brake valve or an electric service-brake activation device.

5. The electronically controlled brake system as claimed in claim 1, wherein the trailer control module is integrated into the trailer control valve or is connected to the trailer control valve.

6. The electronically controlled brake system as claimed in claim 1, wherein the trailer control module is connected in a signal-conducting fashion to a pilot control module in the trailer control valve, and the pilot control module is configured to generate the redundancy control pressure, under control by the trailer control module, as a function of the electrically specified braking specification.

7. The electronically controllable brake system as claimed in claim 1, wherein a pressure modulator is arranged in the at least one service brake circuit, wherein the pressure modulator has a pressure modulator output, and the pressure modulator is configured to generate a pressure-modulator output pressure as a function of the service-brake control signal and to output it via the pressure modulator output, wherein the pressure-modulator output pressure can be transmitted as a service-brake brake pressure to the service brakes of the at least one service brake circuit.

8. The electronically controllable brake system as claimed in claim 7, wherein the switching valve is embodied as a shuttle valve or an electrically or pneumatically controllable 3/2-way valve,
   wherein the shuttle valve is configured to set the first or the second switching valve-switched position as a function of which of the redundancy control pressure or the service-brake control pressure or the pressure-modulator output pressure is higher, wherein the first switching-valve switched position is set if the service-brake control pressure is higher than the redundancy control pressure and the pressure-modulator output pressure or the pressure-modulator output pressure is higher than the redundancy control pressure and the service-brake control pressure, and the 3/2-way valve can be switched into the first switching-valve switched position or into the second switching-valve switched position as a function of an electrically specified switching signal or a pneumatically specified switching control pressure, wherein the switching signal or the switching control pressure can be generated as a function of whether a requested service-brake braking specification is present in the at least one service brake circuit.

9. The electronically controllable brake system as claimed in claim 7, wherein either the pressure-modulator output pressure or the redundancy control pressure can be predefined as a service-brake brake pressure to the service brakes in the at least one service brake circuit, wherein a switching valve is connected upstream of the service brakes, wherein the switching valve can be placed in two switching-valve switched positions, and in a first switching-valve switched position the switching valve can apply the pressure-modulator output pressure, and in a second switching-valve switched position the switching valve can apply the redundancy control pressure, which is generated in the trailer control valve, as a service-brake brake pressure to the service brakes, in order to redundantly actuate the service brakes.

10. The electronically controllable brake system as claimed in claim 9, wherein the switching valve is arranged in the at least one service brake circuit, preferably on a vehicle axle which is assigned to the at least one service brake circuit, and in a first switching-valve switched position the switching valve connects the pressure modulator output to the service brakes in order to specify the pressure-modulator output pressure as a service-brake brake pressure to the service brakes, and in a second switching-valve switched position the switching valve connects the redundancy output of the trailer control valve to the service brakes in order to specify the redundancy control pressure as a service-brake brake pressure to the service brakes.

11. The electronically controllable brake system as claimed in claim 9, wherein a redundancy switching valve is arranged as a switching valve in or on the trailer control valve, and in the first switching-valve switched position the redundancy switching valve connects the pressure modulator output to the redundancy output of the trailer control valve, and in the second switching-valve switched position the redundancy switching valve outputs the redundancy control pressure, which is generated in the trailer control valve, to the redundancy output, wherein the redundancy output of the trailer control valve is connected to the service brakes.

12. The electronically controllable brake system as claimed in claim 7, wherein the pressure modulator has a pneumatic redundancy port, and for the pneumatic redundancy port the redundancy control pressure or a service-brake control pressure, applied by an electropneumatic service brake valve on the basis of a service-brake braking specification, can be specified as a redundancy pressure, wherein a switching valve is connected upstream of the respective redundancy port, wherein the switching valve can be placed in two switching-valve switched positions, and in a first switching-valve switched position the switching valve can output the service-brake control pressure which is applied by the service brake valve on the basis of the service-brake braking specification, and in a second switching-valve switched position the switching valve can output the redundancy control pressure which is generated in the trailer control valve, as a redundancy pressure, to the redundancy port, in order to redundantly actuate the pressure modulator.

13. The electronically controllable brake system as claimed in claim 12, wherein the switching valve is arranged in the at least one service brake circuit, preferably on a vehicle axle which is assigned to the at least one service brake circuit, and in the first switching-valve switched position the switching valve connects the service brake valve to the redundancy port in order to specify the service-brake control pressure as a redundancy pressure to the redundancy port, and in the second switching-valve switched position the switching valve connects the redundancy output of the trailer control valve to the redundancy port, in order to specify the redundancy control pressure as a redundancy pressure to the redundancy port.

14. The electronically controllable brake system as claimed in claim 12, wherein a redundancy switching valve is arranged as a switching valve in or on the trailer control valve, and in the first switching-valve switched position the redundancy switching valve connects the service brake valve to the redundancy output of the trailer control valve, and in the second switching-valve switched position the redundancy switching valve outputs the redundancy control pressure, which is generated in the trailer control valve, to the redundancy output, wherein the redundancy output of the trailer control valve is connected to the redundancy port of the pressure modulator.

15. The electronically controllable brake system as claimed in claim 12, wherein, if a specification of the service-brake brake pressure is prevented as a function of the service-brake control signal, the pressure modulator is configured to generate the pressure-modulator output pressure as a function of the service-brake control pressure, which is fed to the redundancy port, or as a function of the redundancy control pressure, in order to redundantly specify the service-brake brake pressure.

16. The electronically controllable brake system as claimed in claim 1, wherein furthermore a shutoff valve is provided in the brake system, wherein in a first shutoff-valve switched position the shutoff valve prevents application of the service-brake braking pressure to the service brakes as a function of the redundancy control pressure which is generated in the trailer control valve, and in a second shutoff-valve switched position the shutoff valve permits the regulation as a function in order to redundantly implement the braking specification via the at least one service brake circuit, wherein in the first shutoff-valve switched position the shutoff valve is configured to bleed the service brakes and/or a redundancy pressure line running between the redundancy output of the trailer control valve and the at least one service brake circuit.

17. The electronically controllable brake system as claimed in claim 16, wherein the shutoff valve is integrated into the trailer control valve or is arranged in the redundancy pressure line, connected downstream of the redundancy output.

18. The electronically controllable brake system as claimed in claim 16, wherein the switching valve forms the shutoff valve, wherein in the first the switching-valve switched position the switching valve is configured to bleed the service brakes and/or the redundancy pressure line.

19. The electronically controllable brake system as claimed in claim 1, wherein the at least one service brake circuit and/or the service-brake control module is supplied with energy by a first energy source and the parking brake circuit and/or the trailer control valve is supplied with energy by a second energy source, wherein the first energy source is independent of the second energy source.

20. The electronically controllable brake system as claimed in claim 1, wherein the brake system is connected to a CAN bus of the vehicle, and the braking specification can be transmitted via the CAN bus to the at least one service brake circuit and/or the trailer control valve of the brake system.

21. A vehicle having an electronically controllable brake system as claimed in claim 1.

22. A method for controlling an electronic brake system, the method comprising:
   detecting whether a braking specification can be implemented via at least one service brake circuit and under electrical control by the service-brake control module;
   generating a redundancy control pressure in the trailer control valve as a function of the braking specification which is electrically specified, wherein the redundancy control pressure is generated in a controlled manner by the trailer control module in the trailer control valve; and
   generating a service-brake brake pressure in the at least one service brake circuit and/or a trailer control pressure for outputting to the trailer as a function of the redundancy control pressure which is generated in the trailer control valve, if implementation of the braking specification via the at least one service brake circuit under electrical control by the service-brake control module is prevented, wherein the electronic brake system comprises:
      at least one service brake circuit with service brakes and a service-brake control module, wherein a service-brake brake pressure can be fed to the service brakes, and the service-brake control module is configured to generate a service-brake control signal as a function of a braking specification, wherein the service-brake brake pressure can be generated as a function of the service-brake control signal and specified to the service brakes, for the implementation of the braking specification via the at least one service brake circuit, under electrical control, and
      a trailer control valve with a trailer control module, wherein the trailer control module is configured to receive and process an electronically communicated braking specification and the trailer control valve is configured to generate and output, under the control of the trailer control module, a redundancy control pressure as a function of the electronically communicated braking specification,
   wherein if implementation of the braking specification, under electrical control by the service-brake control module, via the at least one service brake circuit is prevented:
      the service-brake brake pressure can be generated as a function of the redundancy control pressure generated in the trailer control valve, and can be applied to the service brakes of the at least one service brake circuit, for redundant implementation of the braking specification in the vehicle, and/or
      a trailer control pressure can be generated as a function of the redundancy control pressure generated in the trailer control valve, and can be output to a trailer for the redundant implementation of the braking specification in the trailer.

23. The method as claimed in claim 22, wherein, in order to specify the service-brake brake pressure to the service brake system as a function of the redundancy control pressure which is generated by the trailer control valve, this redundancy control pressure is fed to the service brakes directly as a service-brake brake pressure or to the redundancy port of the pressure modulator as a redundancy pressure, and
   wherein the service-brake brake pressure is generated and applied in the pressure modulator as a function thereof if implementation of the braking specification under electrical control by the service-brake control module, via the at least one service brake circuit, is prevented.

24. A method for controlling an electronic brake system, the method comprising:
   detecting whether a braking specification can be implemented via at least one service brake circuit and under electrical control by the service-brake control module;
   generating a redundancy control pressure in the trailer control valve as a function of the braking specification which is electrically specified, wherein the redundancy control pressure is generated in a controlled manner by the trailer control module in the trailer control valve; and
   generating a service-brake brake pressure in the at least one service brake circuit and/or a trailer control pressure for outputting to the trailer as a function of the redundancy control pressure which is generated in the trailer control valve, if implementation of the braking specification via the at least one service brake circuit under electrical control by the service-brake control module is prevented, wherein if implementation of the braking specification, under electrical control by the service-brake module, via the at least one service brake circuit is possible,
      the trailer control pressure can also be generated as a function of the redundancy control pressure generated in the trailer control valve and output to the trailer, and
      the service-brake brake pressure is not output to the service brakes of the at least one service-brake circuit as a function of the redundancy control pressure which can be generated in the trailer control valve.

* * * * *